US012643245B1

(12) United States Patent
Yako et al.

(10) Patent No.: US 12,643,245 B1
(45) Date of Patent: Jun. 2, 2026

(54) MULTI-MODAL, RECONFIGURABLE, AND ADAPTIVE GRIPPING SYSTEM AND METHOD TO HANDLE ITEM VARIABILITY

(71) Applicant: Amazon Technologies, Inc., Seattle, WA (US)

(72) Inventors: Connor Yako, Boston, MA (US); Fan Wang, Andover, MA (US); Jianying Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 846 days.

(21) Appl. No.: 18/063,316

(22) Filed: Dec. 8, 2022

(51) Int. Cl.
　　*B25J 15/00*　　(2006.01)
　　*B25J 15/10*　　(2006.01)
(52) U.S. Cl.
　　CPC ........... *B25J 15/10* (2013.01); *B25J 15/0004* (2013.01)
(58) Field of Classification Search
　　CPC .... B25J 15/10; B25J 15/0004; B25J 15/0616; B25J 15/0023; B25J 15/0033; B25J 15/0052; B25J 15/0095; B25J 15/12

USPC .......................... 700/259, 114, 228; 294/106
See application file for complete search history.

(56) References Cited

U.S. PATENT DOCUMENTS

| | | | |
|---|---|---|---|
| 2014/0197652 A1* | 7/2014 | Wang ................... | B25J 15/0009 |
| | | | 294/185 |
| 2015/0314439 A1* | 11/2015 | Wang ..................... | B25J 9/1612 |
| | | | 700/262 |
| 2016/0073584 A1* | 3/2016 | Davidson ............... | A01D 46/30 |
| | | | 294/198 |

\* cited by examiner

*Primary Examiner* — Jacob A Smith
(74) *Attorney, Agent, or Firm* — Athorus, PLLC

(57) ABSTRACT

A multi-modal, reconfigurable, and adaptive gripper system may include a suction cup assembly, a static finger assembly, and at least two reconfigurable finger assemblies that are controlled by a pressure-regulated actuation assembly. In order to grasp an item, a grasp mode, a finger configuration, and/or force(s) to apply to the item may be selected or determined. Various combinations of the suction cup assembly and finger assemblies may be used, with various finger configurations, and with various air pressures or differentials supplied by the pressure-regulated actuation assembly, in order to apply the selected force(s) to portions of the item and reliably grasp, transport, and release the item as part of various automated material handling processes.

20 Claims, 17 Drawing Sheets

MULTI-MODAL, RECONFIGURABLE, AND ADAPTIVE GRIPPING SYSTEM AND METHOD TO HANDLE ITEM VARIABILITY

BACKGROUND

Many companies may store, package, and ship items and/or groups of items from material handling facilities. For example, many companies may receive items in a material handling facility and ship items to various destinations (e.g., customers, stores) from the material handling facility. Various automated material handling systems and processes may pick, sort, store, transport, and/or pack various types of items. However, such conventional material handling systems and processes may fail to reliably or precisely grasp, transport, and release different types of items having variable characteristics. Accordingly, there is a need for safe, reliable, and efficient automated systems and methods to grasp and transport items with variable characteristics.

DETAILED DESCRIPTION

Figure 1:
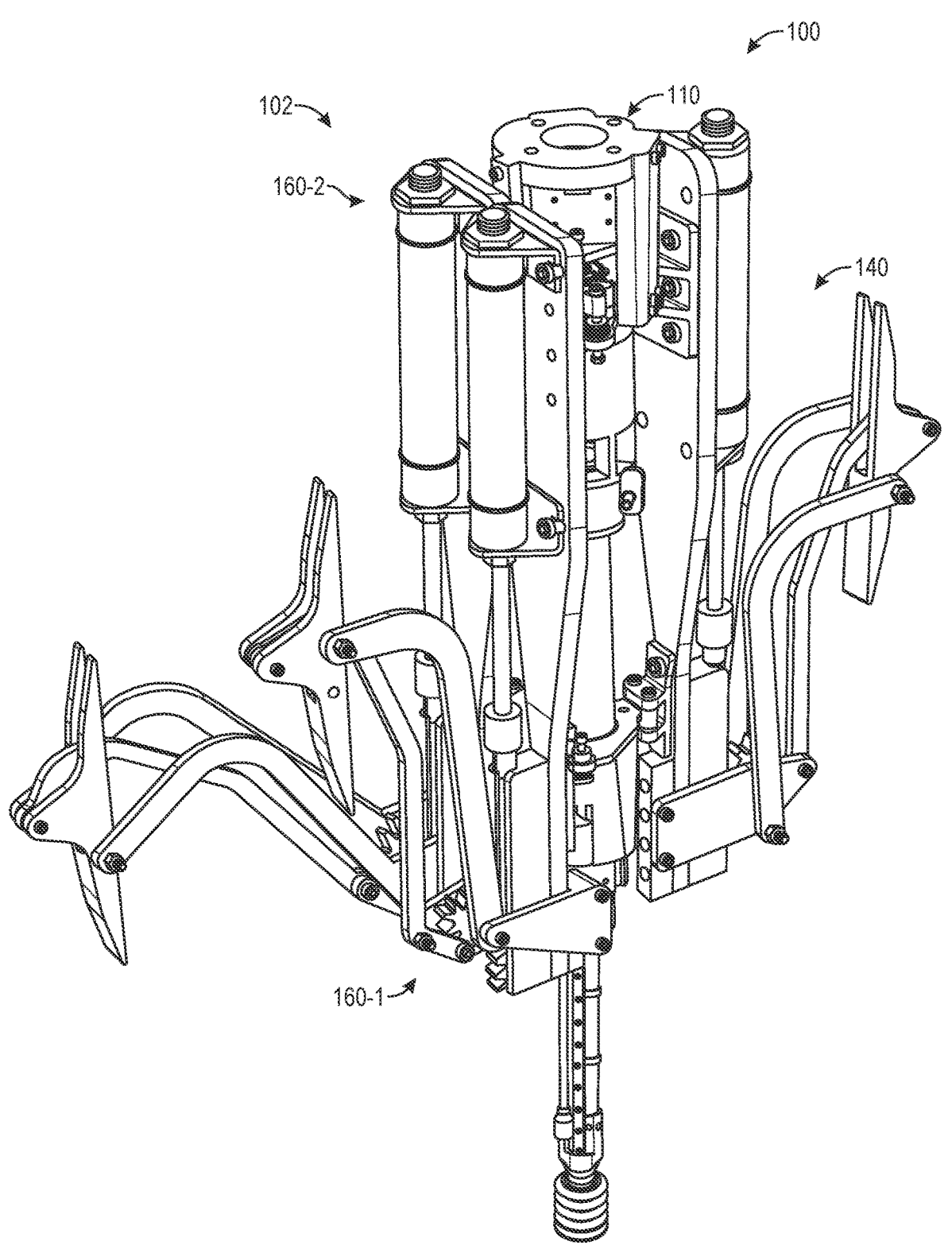
FIG. 1 is a schematic, perspective view diagram of an example gripper, in accordance with implementations of the present disclosure.

As is set forth in greater detail below, implementations of the present disclosure are directed to a multi-modal, reconfigurable, and adaptive gripping system and method to enable reliable grasping of various types of items having variable characteristics.

In example embodiments, the gripping system and method described herein may enable grasping of various types of items having variable characteristics, such as different dimensions, shapes, weights, materials, friction, flexibility, rigidity, or other characteristics. In some examples, the variable types of items may include different types of shapes, such as rectangular prisms, cylinders, spheres or balls, substantially flat or planar, symmetric, asymmetric, uneven, odd, or deformable shapes, or others, different types of containers, such as boxes, bags, bottles, packaged, unpackaged, or others, different types of materials, such as metals, plastics, films, paper, cardboard, fabrics, glass, or others, and/or different types of structural strength, such as rigid, flexible, compressible, deformable, fragile, or others.

In example embodiments, the gripping system and method described herein may utilize one or more modes to grasp items, including suction cups, grasping fingers, and/or enveloping or supporting fingers. In some example modes, suction cups may be used alone to grasp some items. In other example modes, grasping fingers may be used alone to grasp other items. In further example modes, suction cups and grasping fingers may be used concurrently or in various sequences to grasp further items.

In example embodiments, the gripping system and method described herein may be coupled to a robotic system, such as a gantry system, robotic arm, or other types of movement systems. In addition, a perception system, such as cameras, scanners, or other item identification systems, may detect and identify an item to be grasped by the gripping system. Based on data identifying the item that is captured by the perception system, the robotic system may move the gripping system to a position, e.g., a determined pick point or position, to initiate grasping of the item. Further, based on the identified item, various parameters associated with grasping the item may be determined or selected, such as a grasping mode, finger configuration, actuation pressures or forces, or other parameters.

In example embodiments, the gripping system and method described herein may include a suction cup assembly and a plurality of finger assemblies. For example, the suction cup assembly may be generally centrally positioned on the gripping system. In addition, the suction cup assembly may include a relatively small suction cup to more reliably develop a good seal with items, and may apply relatively lower suction or vacuum pressures to avoid or prevent oversuction and/or item damage. Further, the suction cup assembly may be extendible or retractable during grasping, transport, and/or release of the item.

In example embodiments, the plurality of finger assemblies may include a static finger assembly and two or more reconfigurable finger assemblies. For example, the static finger assembly may be generally fixed in position relative to the gripping system. In addition, the reconfigurable finger assemblies may be movable or rotatable relative to the gripping system to modify the overall finger gripping configuration. Further, each of the finger assemblies may comprise parallel linkage mechanisms operatively coupled to one or more pressure-regulated actuation assemblies to grasp items by the finger assemblies upon application of desired pressures or forces, while allowing variability in the resultant grasping positions to handle item variability. Moreover, the finger assemblies may be generally underactuated by the pressure-regulated actuation assemblies to enable flexible, compliant, and/or backdrivable grasping of various types of items having variable characteristics.

Using the gripping systems and methods described herein, safe and reliable grasping of various types of items having variable characteristics may be achieved using a single multi-modal, reconfigurable, and adaptive gripping system and associated methods. The various modes may include suction, gripping, enveloping, and/or various combinations or sequences thereof. In addition, the various finger configurations may include offset opposed gripping, in-line opposed gripping, radial gripping, or others. Further, the gripping forces and resultant positions may be adaptive and flexible due to the pressure-regulated actuation assemblies and corresponding operation.

FIG. 1 is a schematic, perspective view diagram 100 of an example gripper, in accordance with implementations of the present disclosure.

As shown in FIG. 1, an example gripper or gripping system 102 may comprise a central assembly 110, a static finger assembly 140, and a plurality of reconfigurable finger assemblies 160. The central assembly 110 may comprise structural support members for various assemblies of the gripper system, an upper support assembly and associated actuator to actuate the reconfigurable finger assemblies, and a suction cup assembly. Further details of the central assembly 110 are described herein at least with respect to FIGS. 2-4, 6, and 7.

The static finger assembly 140 may comprise structural support members that couple the static finger assembly 140 to the central assembly 110, a finger assembly including a parallel linkage mechanism, and a pressure-regulated actuation assembly. Generally, the structural support members of the static finger assembly 140 may be statically or fixedly coupled to the central assembly 110, while allowing actuation of the finger assembly via the pressure-regulated actuation assembly. Further details of the static finger assembly 140 are described herein at least with respect to FIGS. 4 and 5.

The plurality of reconfigurable finger assemblies 160 may comprise structural support members that couple the reconfigurable finger assemblies 160 to the central assembly 110, finger assemblies including parallel linkage mechanisms, and pressure-regulated actuation assemblies. In the example illustrated in FIG. 1, the gripper system 102 may include two reconfigurable finger assemblies 160-1, 160-2, although other examples may include other numbers, configurations, or arrangements of reconfigurable finger assemblies. Generally, the structural support members of the reconfigurable finger assemblies 160 may be movably or rotatably coupled to the central assembly 110, while also allowing actuation of the finger assemblies via the pressure-regulated actuation assemblies. Further details of the reconfigurable finger assemblies 160 are described herein at least with respect to FIGS. 6-9.

The various assemblies and components of the gripper system 102 described herein may be formed of various types of materials, such as metals, plastics, composites, foams, other materials, or combinations thereof. Further, the various assemblies and components of the gripper system 102 described herein may be assembled, coupled, or operatively attached using various types of couplings or fasteners, such as screws, bolts, nuts, rivets, other types of fasteners, adhesives, welds, or combinations thereof.

As further described herein, the gripper system 102 described herein may enable operation in multiple modes, including suction, gripping, enveloping, and/or various combinations or sequences thereof, using multiple finger configurations, and with various applied pressures or forces, in order to reliably grasp various types of items having variable characteristics.

Although FIGS. 1-12B illustrate a particular number, configuration, and arrangement of assemblies and associated components of an example gripper system, other example embodiments of the example gripper system may include various other numbers, configurations, or arrangements of various assemblies and associated components. For example, other numbers, configurations, or arrangements of suction cup assemblies may be included, other numbers, configurations, or arrangements of static and/or reconfigurable finger assemblies may be included, individual finger assemblies may have different shapes, sizes, or configurations, various other types of actuators and actuation assemblies may be utilized, and/or various other modifications may be made to various assemblies and associated components.

Figure 2:
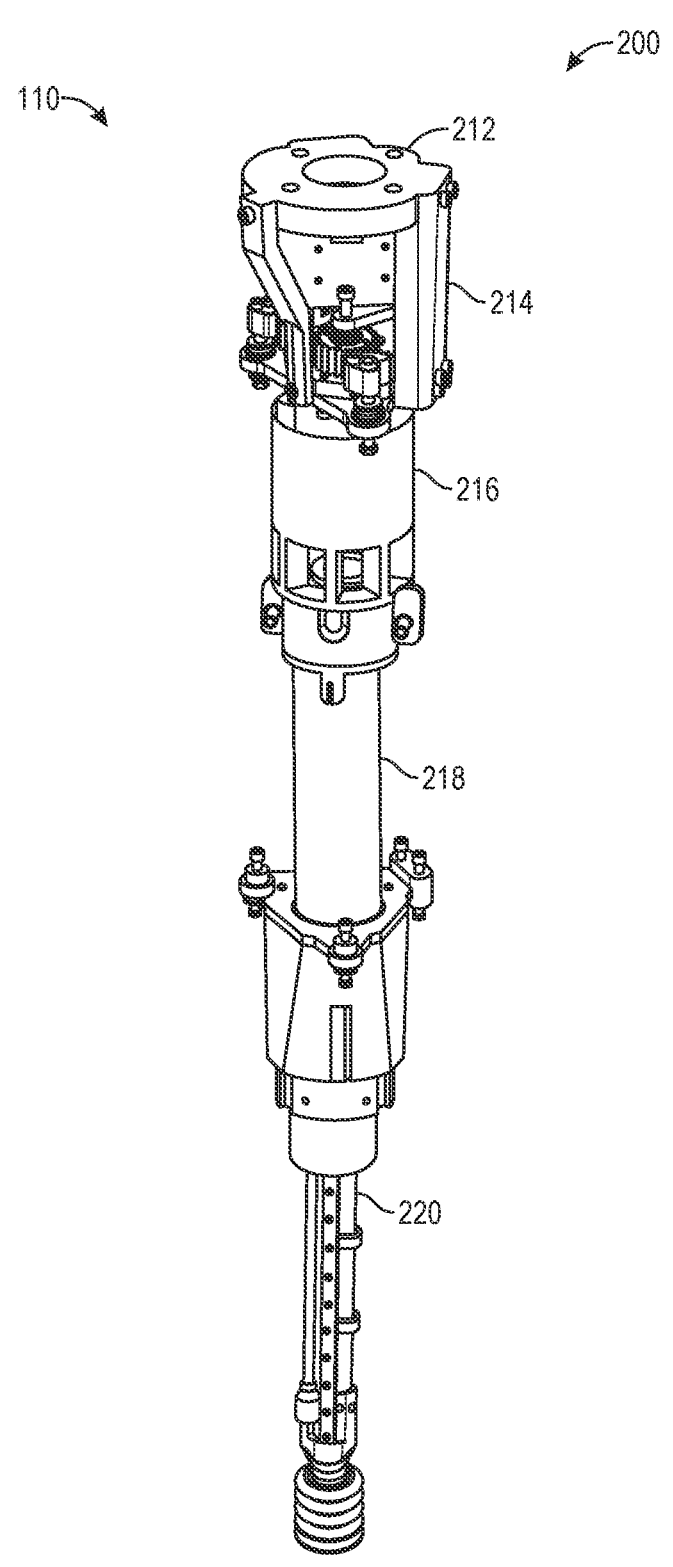
FIG. 2 is a schematic, perspective view diagram of an example central assembly of a gripper, in accordance with implementations of the present disclosure.

FIG. 2 is a schematic, perspective view diagram 200 of an example central assembly of a gripper, in accordance with implementations of the present disclosure.

As shown in FIG. 2, the example central assembly 110 of the gripper system 102 may comprise a robotic system coupling plate 212, an upper support assembly 214, a structural connector 216, a double acting pneumatic actuator 218, and a suction cup assembly 220.

The robotic system coupling plate 212 may comprise a structural plate, surface, bracket, or other component that is configured to couple to a robotic system, such as a gantry system, robotic arm, or other types of movement systems. Upon coupling the robotic system coupling plate 212 to a corresponding interface of a robotic system, the gripper system 102 may be moved or manipulated, e.g., in three-dimensional space, to grasp, transport, and/or release items responsive to movements of the robotic system.

The upper support assembly 214 may comprise various structural members, an upper coupling plate, an actuator, and a geartrain. For example, upper portions of the static and reconfigurable finger assemblies may be coupled to the upper coupling plate of the upper support assembly 214. In addition, the reconfigurable finger assemblies may be moved or rotated relative to the upper support assembly 214 by operation of the actuator and geartrain. Further details of the upper support assembly 214 are described herein at least with respect to FIGS. 4-8.

The structural connector 216 may comprise a structural plate, beam, tube, pipe, cylinder, or other component that is configured to couple the upper support assembly 214 to the double acting pneumatic actuator 218 and suction cup assembly 220. For example, the structural connector 216 may be coupled at an upper extent thereof to the upper coupling plate of the upper support assembly 214, and may be coupled at a lower extent thereof to the double acting pneumatic actuator 218. The size, shape, or dimensions of the structural connector 216 may be determined or selected based on dimensional or operational characteristics of the double acting pneumatic actuator 218 and suction cup assembly 220, as well as the finger assemblies, to enable reliable grasping of items by the gripper system.

The double acting pneumatic actuator 218 may comprise a pneumatic cylinder and corresponding piston that may receive air pressure from a source. The pneumatic cylinder may receive air pressure at a first end thereof to move the piston in a first direction, e.g., extension of the piston, and may receive air pressure at a second opposite end thereof to move the piston in a second direction, e.g., retraction of the piston. The piston of the double acting pneumatic actuator 218 may be coupled to the suction cup assembly 220 in order to extend and retract the suction cup assembly 220 to enable grasping of items by suction or vacuum pressure.

The suction cup assembly 220 may comprise a suction cup, suction or vacuum line, and various connections to the double acting pneumatic actuator 218 for extension and retraction of portions of the suction cup assembly 220. Further details of the suction cup assembly 220 are described herein at least with respect to FIG. 3.

Figure 3:
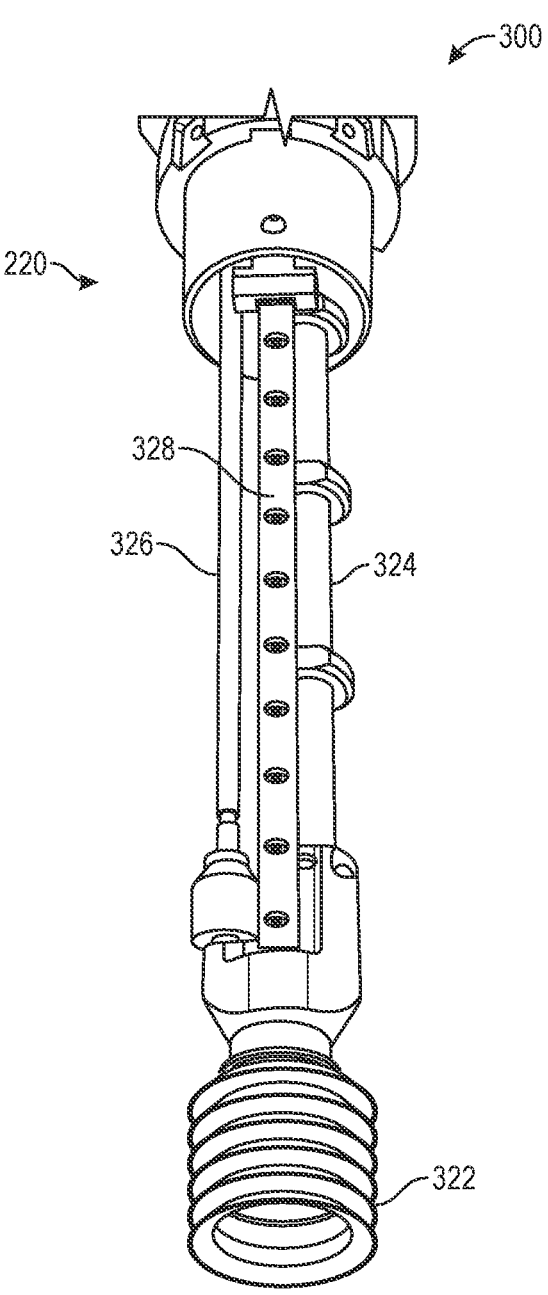
FIG. 3 is a schematic, perspective view diagram of an example suction cup assembly of a gripper, in accordance with implementations of the present disclosure.

FIG. 3 is a schematic, perspective view diagram 300 of an example suction cup assembly of a gripper, in accordance with implementations of the present disclosure.

As shown in FIG. 3, the example suction cup assembly 220 of the central assembly 110 of the gripper system 102 may comprise a suction cup 322, suction or vacuum line 324, piston 326 of the double acting pneumatic actuator 218, and linear guide 328.

The suction cup 322 may comprise a compliant, flexible, and/or compressible suction cup, e.g., made of rubber, silicone, or other similar materials. The suction cup 322 may have a relatively small diameter, such as approximately one half inch, one inch, one and a half inches, or other diameters, such that the suction cup 322 may apply suction or vacuum to a relatively small surface area of an item. In addition, the relatively small diameter of the suction cup 322 may facilitate reliable engagement or sealing between the suction cup 322 and surfaces of various types of items having variable characteristics.

The suction or vacuum line 324 may comprise a tube, pipe, line, or other conduit that is coupled to the suction cup 322 at a first end, and may be coupled to a suction or vacuum source at an opposite end, e.g., via one or more pneumatic lines. The vacuum source may apply a desired suction or vacuum pressure to the suction cup 322 via the suction or vacuum line 324 in order to grasp an item via suction or vacuum. The desired suction or vacuum pressure may be determined or selected based on an identification of an item to be grasped and various associated characteristics described herein. Generally, relatively lower suction or vacuum pressures may be used with the suction cup 322 having a relatively smaller diameter of the gripper system 102 described herein, such that oversuction or damage to an item may be reduced or prevented.

The double acting pneumatic actuator 218 may comprise a cylinder and piston that can be actuated between a retracted position and an extended position by applying air pressure to a first side of the cylinder and piston 326 or by applying air pressure to a second opposite side of the cylinder and piston 326. The double acting pneumatic actuator 218 may be coupled to an air pressure source at each of the first and second sides of the cylinder and piston 326, e.g., via one or more pneumatic lines. The desired air pressures to be applied to the cylinder and piston 326 may be determined or selected based on an identification of an item to be grasped and various associated characteristics described herein. Further details of the operation of an air pressure source and double acting pneumatic actuators having cylinders and associated pistons are described herein at least with respect to FIGS. 11-12B.

In some examples, the piston 326 may remain in the retracted position when the suction cup 322 is not in use to grasp an item. In addition, the piston 326 may move to the extended position in order to reach or contact an item to be grasped by the suction cup 322. In addition, upon grasping an item by the suction cup 322, the piston 326 may move to the retracted position during transport of the item. Further, upon reaching a release position, the piston 326 may again move to the extended position in order to release or drop the item from the suction cup 322. In other examples, the piston 326 may move between the retracted position and the extended position at various other points of grasping, transport, and/or release of an item. In further examples, the piston 326 may remain in one of the retracted position or the extended position during grasping, transport, and/or release of an item.

The linear guide 328 may comprise a linear slide, rail, beam, or other similar structure that enables linear motion but substantially prevents bending, twisting, rotation, pivoting, or other motions. The linear guide 328 may be coupled between the suction cup 322 and portions of the double acting pneumatic actuator 218 to facilitate substantially linear motion of the suction cup 322 during extension or retraction of the piston 326. The linear guide 328 may provide structural and dynamic stability or strength to the suction cup 322, vacuum line 324, and piston 326, and prevent bending, breaking, or binding of the piston 326 during movement or operations between the extended and retracted positions.

Figure 4:
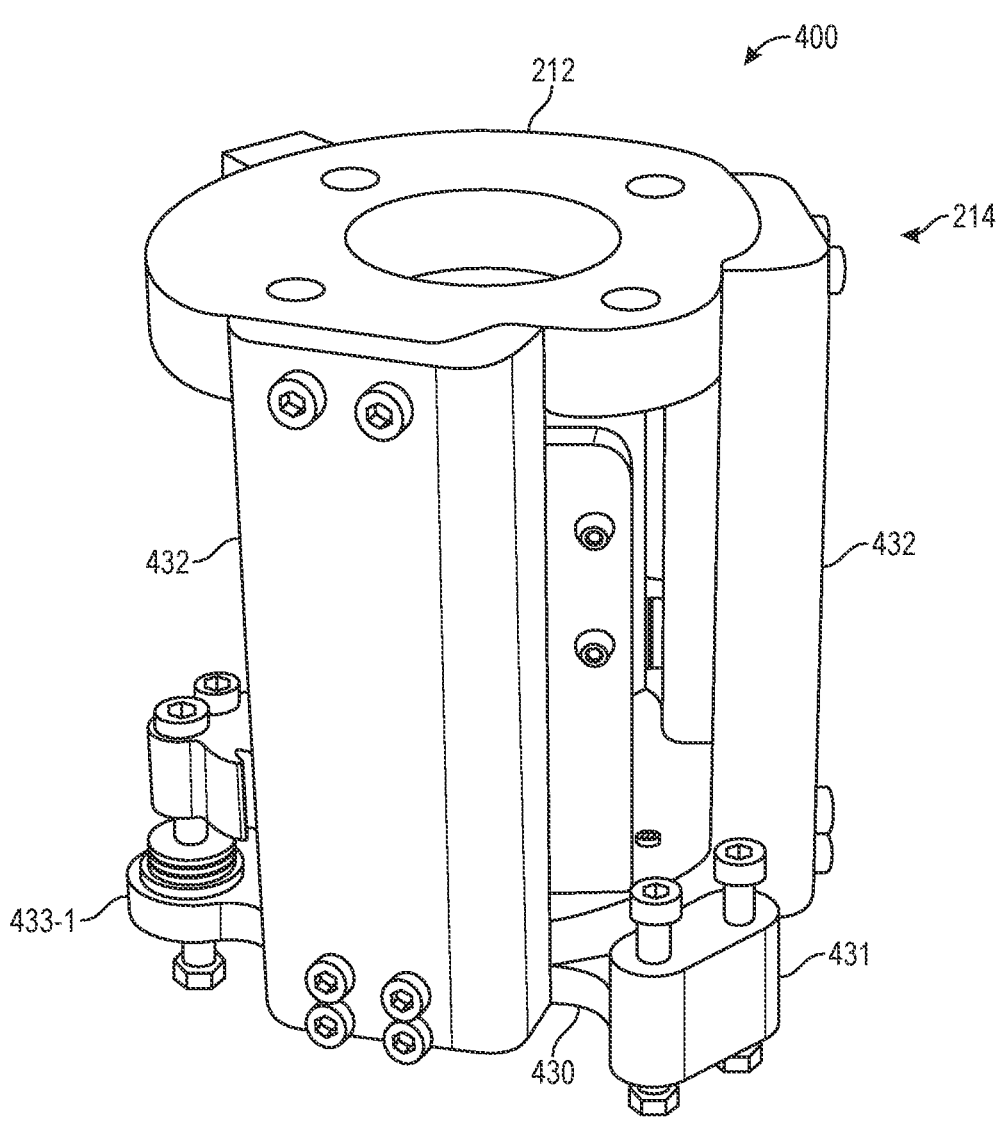
FIG. 4 is a schematic, perspective view diagram of an example upper support assembly of a gripper, in accordance with implementations of the present disclosure.

FIG. 4 is a schematic, perspective view diagram 400 of an example upper support assembly of a gripper, in accordance with implementations of the present disclosure.

As shown in FIG. 4, the upper support assembly 214 of the central assembly 110 of the gripper system 102 may comprise the robotic system coupling plate 212 at an upper extent thereof, an upper coupling plate 430 at a lower extent thereof, a static finger assembly connector 431, a plurality of structural members 432, and a plurality of reconfigurable finger assembly connectors 433.

The upper coupling plate 430 may comprise a structural plate, surface, bracket, or other component that is configured to couple to the structural connector 216 at a lower extent thereof. The robotic system coupling plate 212 may form an upper extent of the upper support assembly 214, and the upper coupling plate 430 may form a lower extent of the upper support assembly 214.

The plurality of structural members 432 may comprise structural beams, plates, brackets, surfaces, or other components that are configured to couple with the robotic system coupling plate 212 and the upper coupling plate 430. Together, the robotic system coupling plate 212, the plurality of structural members 432, and the upper coupling plate 430 may form a housing or enclosure within which an actuator and geartrain for operation of the plurality of reconfigurable finger assemblies may be disposed. Further details of the additional portions of the upper support assembly 214 related to the actuator and geartrain for the plurality of reconfigurable finger assemblies are described herein at least with respect to FIGS. 6-8.

The static finger assembly connector 431 and a plurality of reconfigurable finger assembly connectors 433 may be coupled to or integrally formed with the upper coupling plate 430, although only one reconfigurable finger assembly connector 433-1 is visible in FIG. 4. The static finger assembly connector 431 may comprise a joint or bracket to which a portion of the static finger assembly 140 may couple, in order to locate or position the static finger assembly 140 relative to the central assembly 110. Generally, the static finger assembly connector 431 may be formed or configured to prevent relative movement between the static finger assembly 140 and the central assembly 110, e.g., two fixed pins, fasteners, screws, or other couplings. Further details of the static finger assembly connector 431 and the static finger assembly 140 are described herein at least with respect to FIG. 5.

In addition, the reconfigurable finger assembly connectors 433 may comprise joints or brackets to which portions of the reconfigurable finger assemblies 160 may couple, in order to locate or position the reconfigurable finger assemblies 160 relative to the central assembly 110. Generally, the reconfigurable finger assembly connectors 433 may be formed or configured to allow relative movement, e.g., relative rotation or pivoting movement about a generally vertical axis, between the reconfigurable finger assemblies 160 and the central assembly 110, e.g., one rotatable or pivotable pin, fastener, screw, or other coupling. Further details of the reconfigurable finger assembly connectors 433 and the reconfigurable finger assemblies 160 are described herein at least with respect to FIGS. 6-8.

Figure 5:
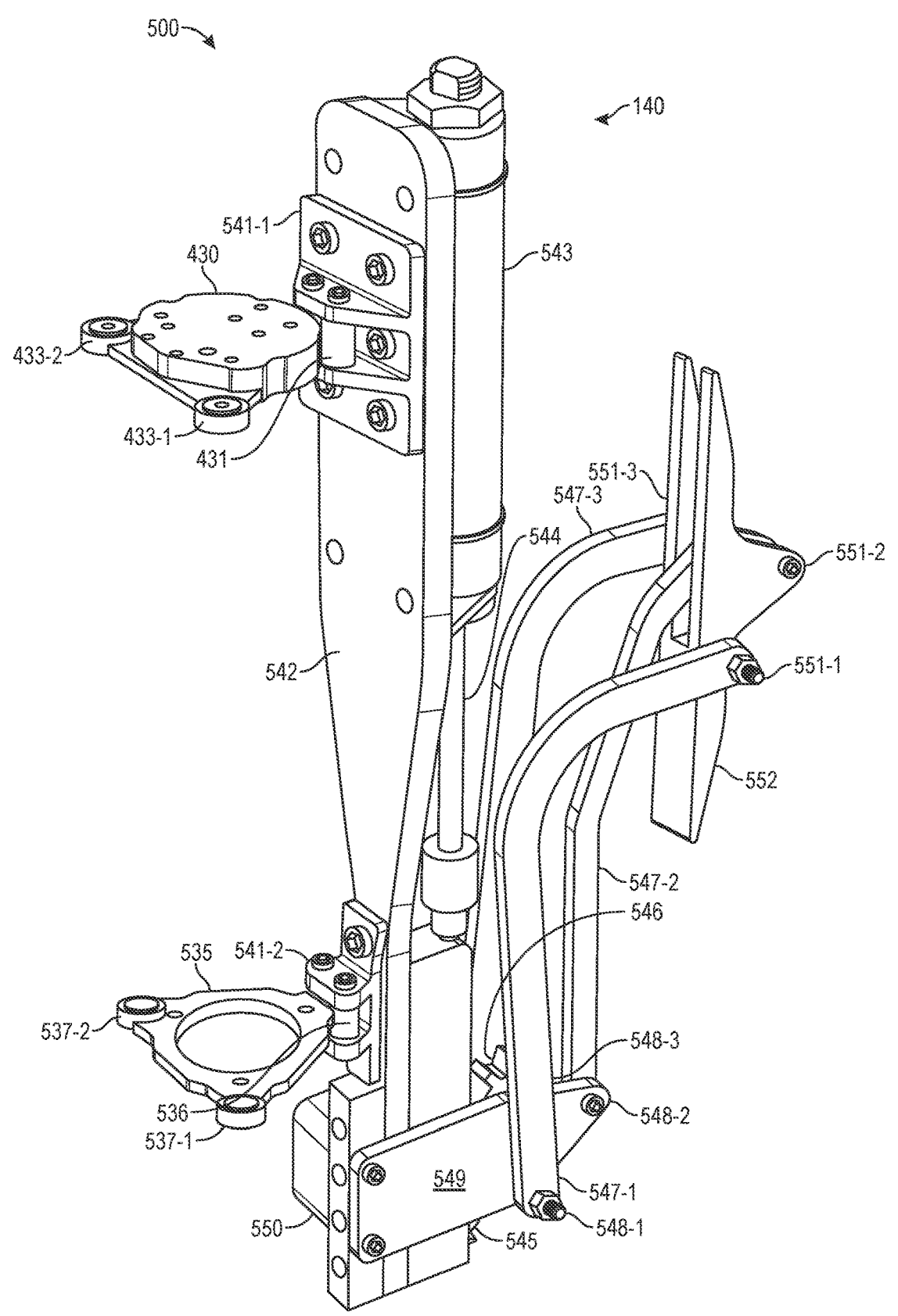
FIG. 5 is a schematic, perspective view diagram of an example static finger assembly of a gripper, in accordance with implementations of the present disclosure.

FIG. 5 is a schematic, perspective view diagram 500 of an example static finger assembly of a gripper, in accordance with implementations of the present disclosure. With the exception of the connections to the central assembly, the static finger assembly is substantially similar to the plurality of reconfigurable finger assemblies as described herein at least with respect to FIG. 9, which illustrates a perspective view diagram of the components of the finger assemblies from an opposing perspective compared to FIG. 5.

As shown in FIG. 5, an example static finger assembly 140 of a gripper system 102 may comprise an upper coupling bracket 541-1, a lower coupling bracket 541-2, a structural plate 542, a double acting pneumatic actuator 543 and piston 544, a rack 545, a gear 546, a plurality of linkages 547, a plurality of first joints 548, linkage brackets 549, 550, a plurality of second joints 551, and a grasping finger 552. Further, in addition to the upper coupling plate 430, the central assembly 110 may also comprise a lower coupling plate 535, as previously illustrated in FIGS. 1 and 2 between the double acting pneumatic actuator 218 and the suction cup assembly 220.

As described herein, the upper coupling plate 430 may include or be integrally formed with the static finger assembly connector 431 and a plurality of reconfigurable finger assembly connectors 433, e.g., two reconfigurable finger assembly connectors 433-1, 433-2. Similar to the upper coupling plate 430, the lower coupling plate 535 may comprise a structural plate, surface, bracket, or other component that is configured to couple to either the double acting pneumatic actuator 218 or the suction cup assembly 220, or between such components of the central assembly 110.

The lower coupling plate 535 may also include or be integrally formed with a static finger assembly connector 536 and a plurality of reconfigurable finger assembly connectors 537, e.g., two reconfigurable finger assembly connectors 537-1, 537-2. The static finger assembly connector 536 of the lower coupling plate 535 may comprise a joint or bracket to which a portion of the static finger assembly 140 may couple, in order to locate or position the static finger assembly 140 relative to the central assembly 110. Generally, the static finger assembly connector 536 may be formed or configured to prevent relative movement between the static finger assembly 140 and the central assembly 110, e.g., two fixed pins, fasteners, screws, or other couplings.

In addition, the reconfigurable finger assembly connectors 537 of the lower coupling plate 535 may comprise joints or brackets to which portions of the reconfigurable finger assemblies 160 may couple, in order to locate or position the reconfigurable finger assemblies 160 relative to the central assembly 110. Generally, the reconfigurable finger assembly connectors 537 may be formed or configured to allow relative movement, e.g., relative rotation or pivoting movement about a generally vertical axis, between the reconfigurable finger assemblies 160 and the central assembly 110, e.g., one rotatable or pivotable pin, fastener, screw, or other coupling. Further details of the reconfigurable finger assembly connectors 433, 537 and the reconfigurable finger assemblies 160 are described herein at least with respect to FIGS. 6-8.

As shown in FIG. 5, the upper coupling bracket 541-1 of the static finger assembly 140 may be fixedly or statically coupled to the static finger assembly connector 431 of the upper coupling plate 430, and the lower coupling bracket 541-2 of the static finger assembly 140 may be fixedly or statically coupled to the static finger assembly connector 536 of the lower coupling plate 535. In this manner, the static finger assembly 140 may be relatively fixed or static in location or position relative to the central assembly 110 of the gripper system 102.

The structural plate 542 may comprise a plate, beam, surface, bracket, or other structural member to which the upper coupling bracket 541-1 and the lower coupling bracket 541-2 may be coupled. In addition, various other components of the static finger assembly 140 described herein may be coupled, directly or indirectly, to portions of the structural plate 542.

The double acting pneumatic actuator 543 may comprise a cylinder and piston 544 that can be actuated between a retracted position and an extended position by applying air pressure to a first side of the cylinder and piston 544 or by applying air pressure to a second opposite side of the cylinder and piston 544. The double acting pneumatic actuator 543 may be coupled to the structural plate 542, and also coupled to an air pressure source at each of the first and second sides of the cylinder and piston 544, e.g., via one or more pneumatic lines. The desired air pressures to be applied to the cylinder and piston 544 may be determined or selected based on an identification of an item to be grasped and various associated characteristics described herein. Further details of the operation of an air pressure source and double acting pneumatic actuators having cylinders and associated pistons are described herein at least with respect to FIGS. 11-12B.

Figure 9:
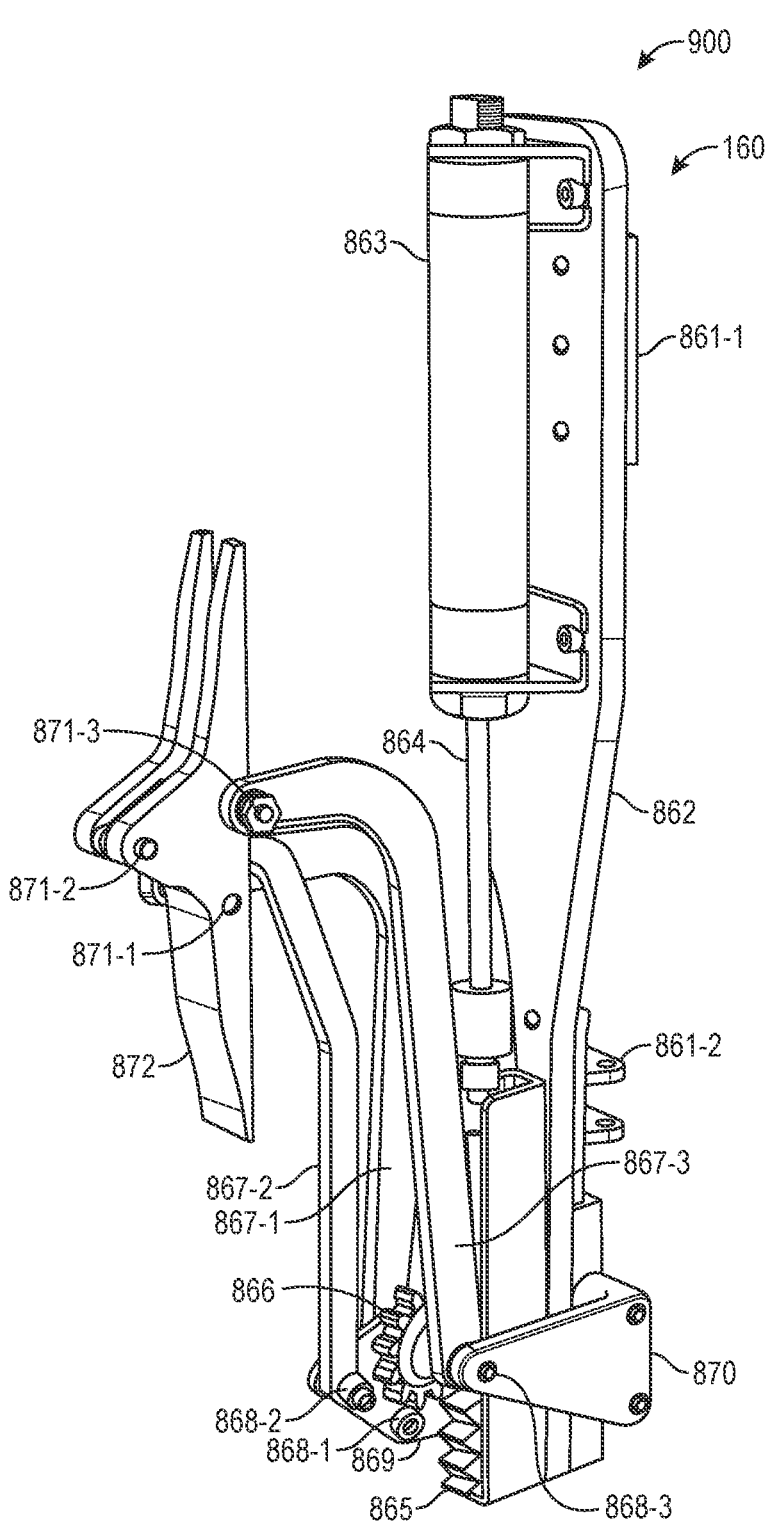
FIG. 9 is another schematic, perspective view diagram of an example reconfigurable finger assembly of a gripper, in accordance with implementations of the present disclosure.

The piston 544 of the double acting pneumatic actuator 543 may be coupled to the rack 545, which is partially visible in FIG. 5 and also in FIG. 9. The rack 545 may comprise a substantially flat set of gear teeth that are configured to mesh with and cause rotation of the gear 546, similar to a rack-and-pinion arrangement. Because the rack 545 is coupled to the piston 544 of the double acting pneumatic actuator 543, upon movement of the piston 544 to a retracted position, the rack 545 may move upward with retraction of the piston 544 and cause corresponding rotational movement of the gear 546 due to the meshing teeth between the rack 545 and the gear 546. Likewise, upon movement of the piston 544 to an extended position, the rack 545 may move downward with extension of the piston 544 and cause corresponding rotational movement of the gear 546 due to the meshing teeth between the rack 545 and the gear 546.

The gear 546 may comprise a spur gear, helical gear, or other types of gears having teeth that are configured to mate with teeth of the rack 545. The gear 546 may be freely or passively rotatably coupled between linkage brackets 549, 550, which may comprise plates, beams, surfaces, or other structural members. In addition, the linkage brackets 549, 550 may be coupled to portions of the structural plate 542. As a result, the gear 546 may be held in position relative to the linkage brackets 549, 550 and the structural plate 542, and the gear 546 may freely or passively rotate responsive to substantially vertical movement of the rack 545 due to meshing teeth between the gear 546 and rack 545.

The plurality of linkages 547 may comprise beams, rods, poles, or other structural members that are coupled to the plurality of first joints 548 of the linkage brackets 549, 550 at first ends of the linkages 547, and that are coupled to the plurality of second joints 551 of portions of the grasping finger 552 at second ends of the linkages 547. The linkages 547 may be straight, curved, angled, or include other shapes, sizes, or dimensions.

The first joints 548 and second joints 551 of the linkages 547 may each comprise rotatable or pivotable joints to enable rotational motion of the linkages 547 relative to the linkage brackets 549, 550 and relative to the grasping finger 552. For example, at first ends of the linkages 547 proximate the linkage brackets 549, 550, a first linkage 547-1 coupled to a first lower joint 548-1 of the linkage brackets 549, 550 may be able to rotate or pivot around a substantially horizontal axis that extends through the first lower joint 548-1. In addition, a second linkage 547-2 coupled to a first intermediate joint 548-2 of the linkage brackets 549, 550 may be able to rotate or pivot around a substantially horizontal axis that extends through the first intermediate joint 548-2. Further, a third linkage 547-3 coupled to a first upper joint 548-3 of the linkage brackets 549, 550 may be able to rotate or pivot around a substantially horizontal axis that extends through the first upper joint 548-3.

In similar manner, at second ends of the linkages 547 proximate the grasping finger 552, a first linkage 547-1 coupled to a second lower joint 551-1 of the grasping finger 552 may be able to rotate or pivot around a substantially horizontal axis that extends through the second lower joint 551-1. In addition, a second linkage 547-2 coupled to a second intermediate joint 551-2 of the grasping finger 552 may be able to rotate or pivot around a substantially horizontal axis that extends through the second intermediate joint 551-2. Further, a third linkage 547-3 coupled to a second upper joint 551-3 of the grasping finger 552 may be able to rotate or pivot around a substantially horizontal axis that extends through the second upper joint 551-3.

In example embodiments, the linkages 547, first joints 548, and second joints 551 may form a parallel linkage mechanism that can move the grasping finger 552 from a raised, retracted position, as shown in FIG. 5, to a lowered, extended position, responsive to rotation of the linkages 547 downward in a clockwise direction around first joints 548 with respect to FIG. 5. In addition, the parallel linkage mechanism can move the grasping finger 552 from a lowered, extended position to a raised, retracted position, as shown in FIG. 5, responsive to rotation of the linkages 547 upward in a counter-clockwise direction around first joints 548 with respect to FIG. 5. Because the linkages 547, first joints 548, and second joints 551 may form a parallel linkage mechanism, the vertical orientation of the grasping finger

552 may remain substantially unchanged or unrotated in each of the raised, retracted position and the lowered, extended position, as well as all intermediate positions therebetween.

In addition, the first joints 548-1, 548-2, 548-3 may be positioned in a triangular configuration or arrangement on or between the linkage brackets 549, 550, and the second joints 551-1, 551-2, 551-3 may also be positioned in a similar or identical triangular configuration or arrangement on the grasping finger 552. The three linkages 547 coupled at first and second ends thereof to respective first and second joints 548, 551 in a triangular configuration or arrangement may prevent binding, overlapping, criss-crossing, or other unintentional movements of the linkages 547 relative to each other so that the parallel linkage mechanism described herein may reliably and continuously move between the retracted and extended positions, as well as all intermediate positions therebetween.

Furthermore, the third linkage 547-3 may be coupled to or integrally formed with the gear 546, such that the third linkage 547-3 is rotationally fixed together with the gear 546. As a result, responsive to rotation of the gear 546 by movement of the rack 545, the third linkage 547-3 may move in corresponding manner with the rotation of the gear 546. Because the linkages 547, first joints 548, and second joints 551 may form a parallel linkage mechanism, movement of the third linkage 547-3 response to rotation of the gear 546 may also cause corresponding movement of the first and second linkages 547-1, 547-2, and corresponding movement of the grasping finger 552 that is coupled to second ends of the linkages 547.

In addition, the static finger assembly 140 may be considered underactuated because only one linkage, e.g., third linkage 547-3, may be actuated to move or rotate around the first upper joint 548-3 responsive to movement of the gear 546, which then causes corresponding movement of the entire parallel linkage mechanism based on the fixed relative positions of the first joints 548, second joints 551, and linkages 547 connected therebetween. Moreover, by underactuating the parallel linkage mechanism, the parallel linkage mechanism may exhibit an improved or greater degree of compliance, flexibility, and/or backdrivability during grasping of an item by the finger assemblies. In contrast, other example embodiments that are not underactuated may actuate multiple or all of the linkages around respective joints to move the parallel linkage mechanism.

The grasping finger 552 may comprise a beam, plate, surface, or other grasping component that is configured to contact and apply pressures or forces to grasp an item. In addition, the grasping finger 552 may have a thin, elongated, vertical shape or profile in order to be able to grasp an item from a set or group of items, e.g., an organized set of items or a cluttered or unorganized mix or combination of items. The thin, elongated, vertical shape or profile may also increase the surface area of contact between the grasping finger 552 and an item to ensure reliable grasping. Moreover, the thin, elongated, vertical shape or profile may reduce an overall size or profile of the gripper system 102 when the finger assemblies are in retracted positions, e.g., for storage or when not in use. Further, portions of the grasping finger 552 that contact an item may also include foam, rubber, silicone, or other compliant, flexible, or compressible materials to increase friction, prevent damage, and/or facilitate grasping of items.

Figure 6:
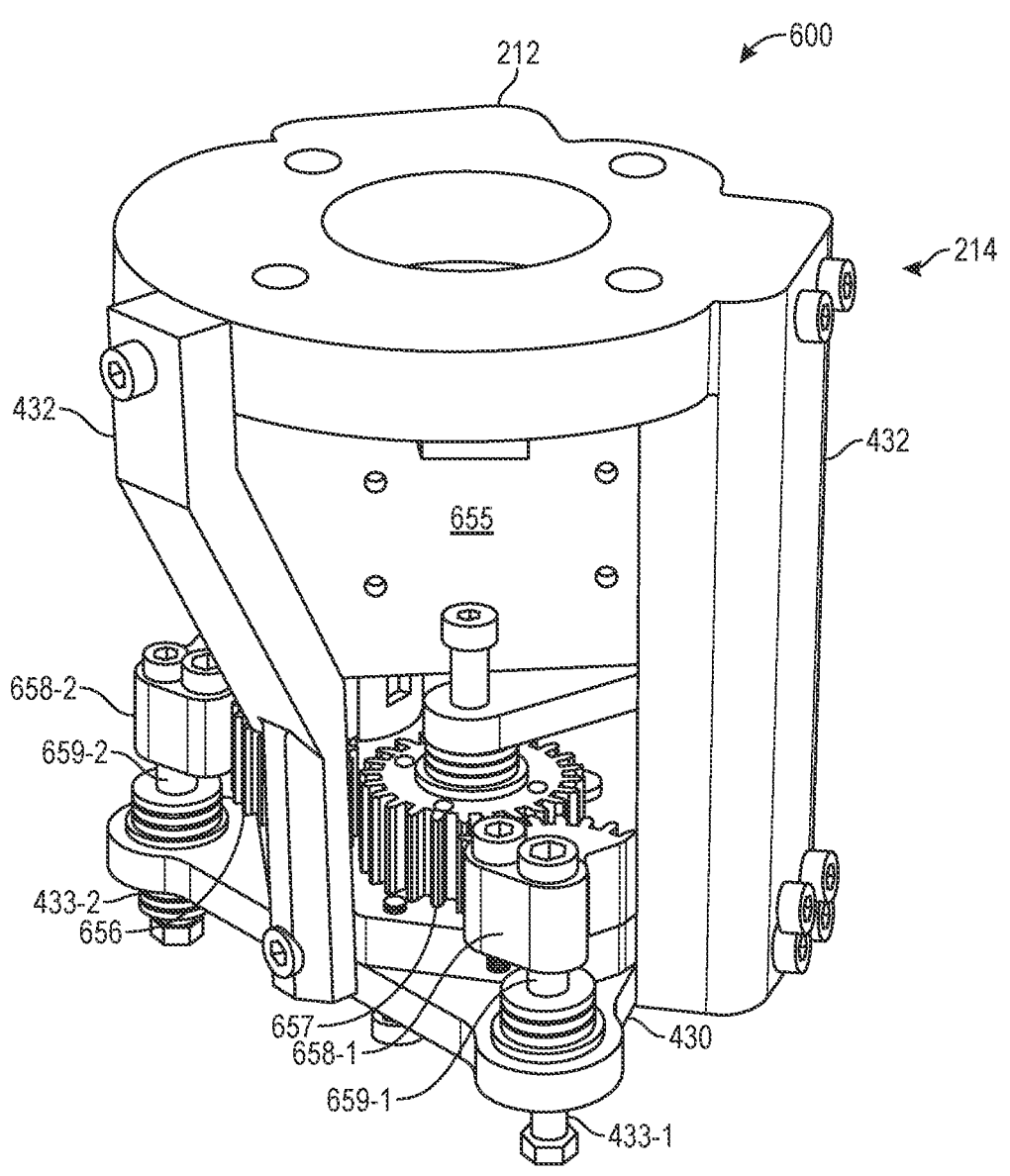
FIG. 6 is another schematic, perspective view diagram of an example upper support assembly of a gripper, in accordance with implementations of the present disclosure.

FIG. 6 is another schematic, perspective view diagram 600 of an example upper support assembly of a gripper, in accordance with implementations of the present disclosure.

Figure 7:
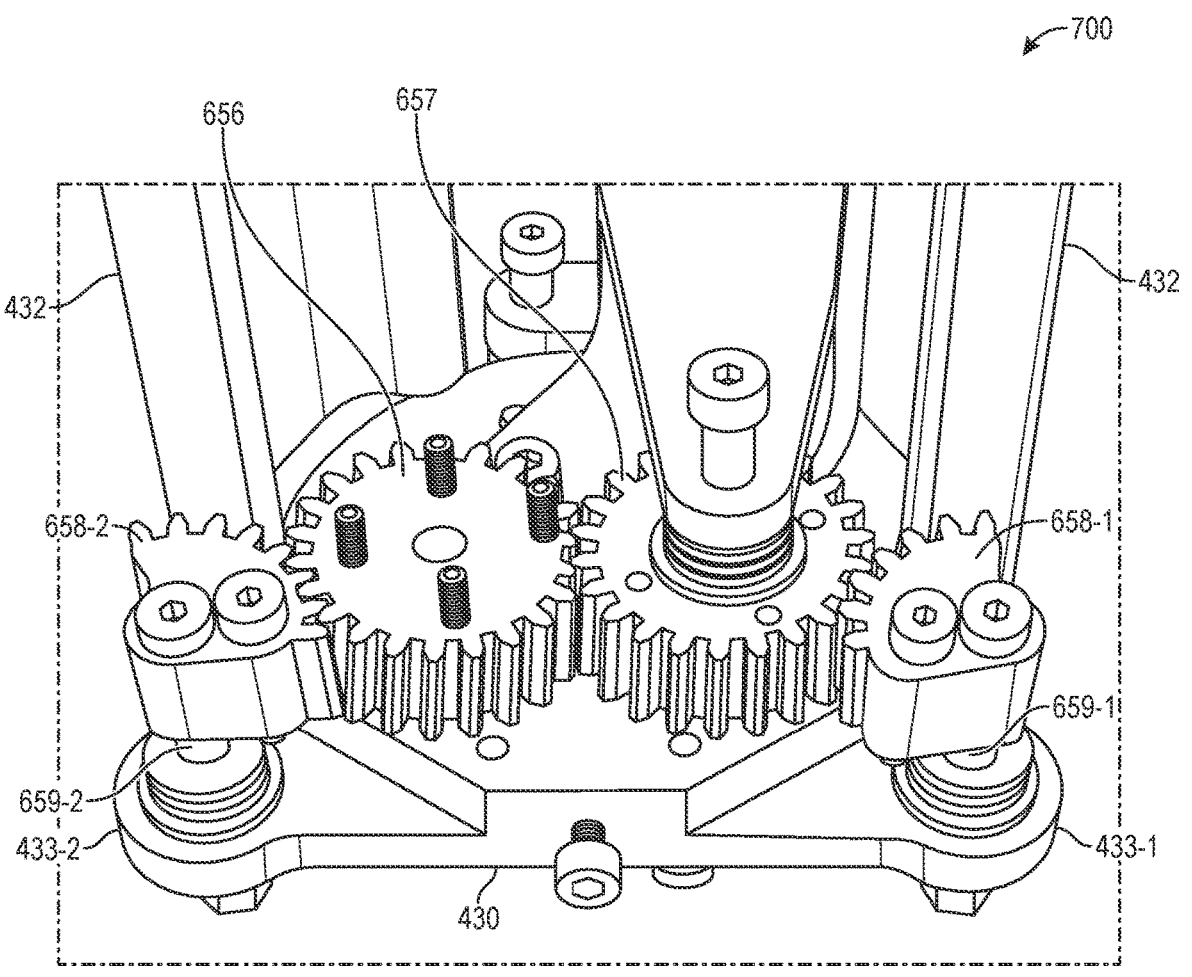
FIG. 7 is a schematic, perspective view diagram of an example geartrain of an upper support assembly of a gripper, in accordance with implementations of the present disclosure.

In this regard, FIG. 6 illustrates a different perspective view of the upper support assembly 214 than that illustrated and described herein with respect to FIG. 4. FIG. 7 is a schematic, perspective view diagram 700 of an example geartrain of an upper support assembly of a gripper, in accordance with implementations of the present disclosure. In this regard, FIG. 7 illustrates a close-up view of the geartrain of the upper support assembly 214, with the actuator 655 and various structural members 432 removed for clarity of illustration.

As shown in FIG. 6, the upper support assembly 214 of the central assembly 110 of the gripper system 102 may comprise the robotic system coupling plate 212 at an upper extent thereof, an upper coupling plate 430 at a lower extent thereof, a static finger assembly connector that is not visible in FIG. 6, a plurality of structural members 432, a plurality of reconfigurable finger assembly connectors 433, an actuator 655, and a geartrain configured to adjust rotational positions of the reconfigurable finger assemblies 160. Various components of the upper support assembly 214 that have been described herein at least with respect to FIG. 4 are not repeated here with respect to FIGS. 6-7.

As shown in FIGS. 6 and 7, the actuator 655 and a geartrain may be positioned within a housing or enclosure formed by the robotic system coupling plate 212, the plurality of structural members 432, and the upper coupling plate 430 of the upper support assembly 214. The actuator 655 may comprise a motor, servo, or other types of actuators that can rotate a motor gear 656 of the geartrain. The various gears of the geartrain may comprise spur gears, helical gears, or various other types of gears having teeth that can mesh with each other to transfer rotational motion from the actuator 655.

For example, the motor gear 656 may be directly coupled to a shaft of the actuator 655, such that the motor gear 656 rotates together with rotation of the shaft of the actuator 655. The motor gear 656 may have teeth that mesh with teeth of an idler gear 657, thereby causing rotation of the idler gear 657 in a rotational direction that is opposite that of the motor gear 656. In addition, at least a first partial gear 658-1 may have teeth that mesh with teeth of the idler gear 657, thereby causing rotation of the first partial gear 658-1 in a rotational direction that is opposite that of the idler gear 657. Further, at least a second partial gear 658-2 may have teeth that mesh with teeth of the motor gear 656, thereby causing rotation of the second partial gear 658-2 in a rotational direction that is opposite that of the motor gear 656. As a result, the first and second partial gears 658-1, 658-2 may rotate in opposite rotational directions from each other responsive to rotation of the motor gear 656 by the actuator 655.

Moreover, the first partial gear 658-1 may rotate around a first reconfigurable finger assembly joint 659-1 associated with a first reconfigurable finger assembly connector 433-1, and the second partial gear 658-2 may rotate around a second reconfigurable finger assembly joint 659-2 associated with a second reconfigurable finger assembly connector 433-2. As further described herein, portions of the reconfigurable finger assemblies 160 may be rotatably or pivotably coupled to the reconfigurable finger assembly joints 659 associated with the reconfigurable finger assembly connectors 433. In addition, the portions of the reconfigurable finger assemblies 160 may be coupled to portions of the first and second partial gears 658 so that the reconfigurable finger assemblies 160 rotate or pivot with rotation of the first and second partial gears 658 around the reconfigurable finger assembly joints 659. Furthermore, because the first and second partial gears 658 rotate in opposite rotational directions from each other, the reconfigurable finger assemblies 160 coupled to the first and second partial gears 658 may also rotate in opposite rotational directions from each other.

Figure 8:
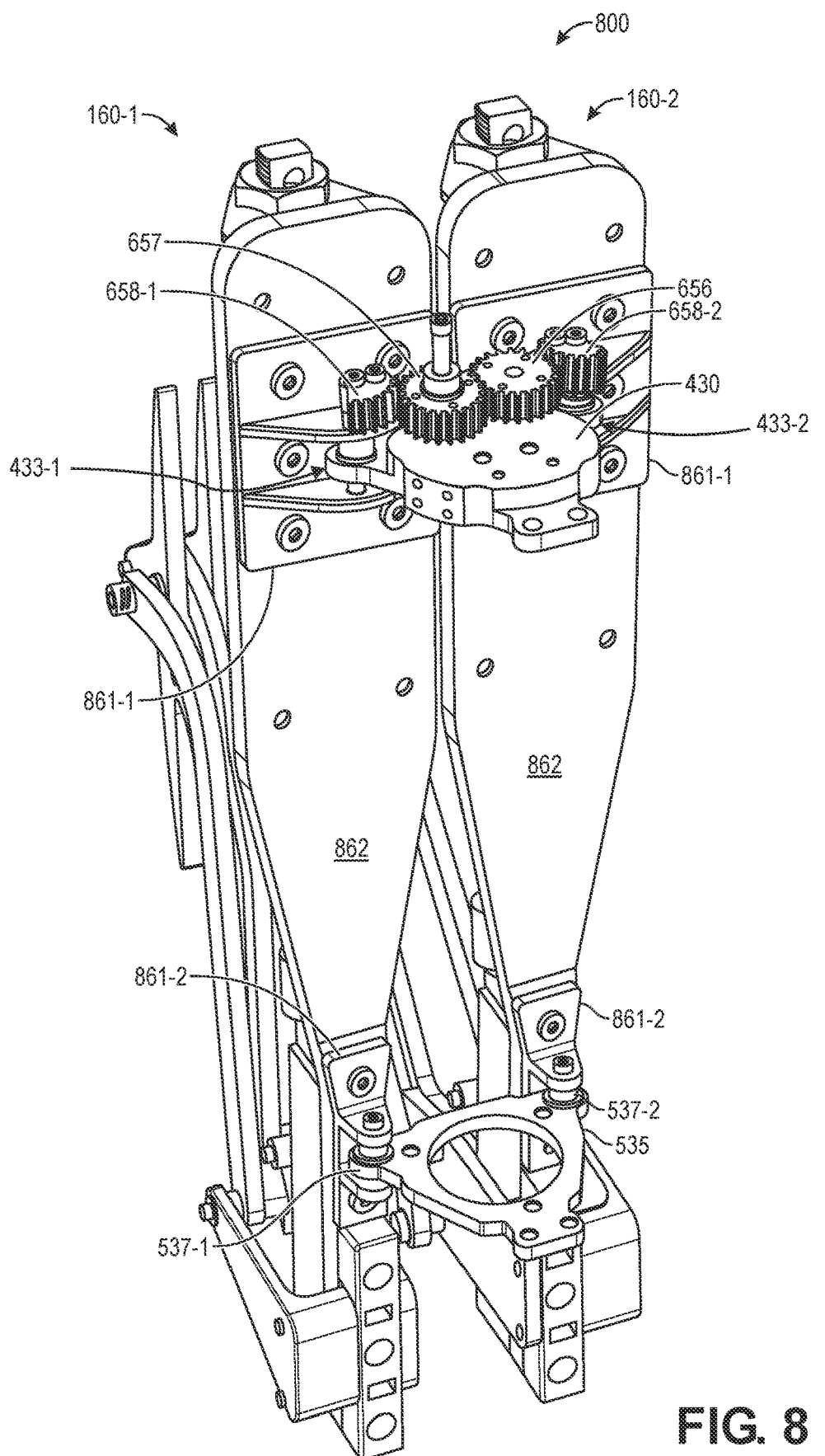
FIG. 8 is a schematic, perspective view diagram of example reconfigurable finger assemblies of a gripper, in accordance with implementations of the present disclosure.

FIG. 8 is a schematic, perspective view diagram 800 of example reconfigurable finger assemblies of a gripper, in accordance with implementations of the present disclosure.

As shown in FIG. 8, two example reconfigurable finger assemblies 160-1, 160-2 of a gripper system 102 may comprise respective upper coupling brackets 861-1, respective lower coupling brackets 861-2, and respective structural plates 862. Additional components of the reconfigurable finger assemblies 160 are described herein at least with respect to FIG. 9. In addition, the upper coupling plate 430 of the central assembly 110, portions of the geartrain, and the lower coupling plate 535 of the central assembly 110 are also illustrated in FIG. 8.

As described herein, the upper coupling plate 430 may include or be integrally formed with the static finger assembly connector 431 and a plurality of reconfigurable finger assembly connectors 433, e.g., two reconfigurable finger assembly connectors 433-1, 433-2. The lower coupling plate 535 may also include or be integrally formed with the static finger assembly connector 536 and a plurality of reconfigurable finger assembly connectors 537, e.g., two reconfigurable finger assembly connectors 537-1, 537-2.

The reconfigurable finger assembly connectors 433 of the upper coupling plate 430 and the reconfigurable finger assembly connectors 537 of the lower coupling plate 535 may comprise joints or brackets to which portions of the reconfigurable finger assemblies 160 may couple, in order to locate or position the reconfigurable finger assemblies 160 relative to the central assembly 110. Generally, the reconfigurable finger assembly connectors 433, 537 may be formed or configured to allow relative movement, e.g., relative rotation or pivoting movement about a generally vertical axis, between the reconfigurable finger assemblies 160 and the central assembly 110, e.g., one rotatable or pivotable pin, fastener, screw, or other coupling.

As shown in FIG. 8, the upper coupling brackets 861-1 of the reconfigurable finger assemblies 160-1, 160-2 may be rotatably or pivotably coupled to the reconfigurable finger assembly connectors 433-1, 433-2 of the upper coupling plate 430, and the lower coupling brackets 861-2 of the reconfigurable finger assemblies 160-1, 160-2 may be rotatably or pivotably coupled to the reconfigurable finger assembly connectors 537-1, 537-2 of the lower coupling plate 535. In this manner, the reconfigurable finger assemblies 160 may rotate or pivot relative to the central assembly 110 of the gripper system 102.

As described herein, the reconfigurable finger assembly 160-1 may be coupled to a portion of the first partial gear 658-1 so that the reconfigurable finger assembly 160-1 rotates or pivots with rotation of the first partial gear 658-1 around the first reconfigurable finger assembly joint of the first reconfigurable finger assembly connector 433-1. Likewise, the reconfigurable finger assembly 160-2 may be coupled to a portion of the second partial gear 658-2 so that the reconfigurable finger assembly 160-2 rotates or pivots with rotation of the second partial gear 658-2 around the second reconfigurable finger assembly joint of the second reconfigurable finger assembly connector 433-2. Thus, responsive to rotation of the motor gear 656 by actuation of the actuator 655, and further responsive to rotation of the idler gear 657 by meshing engagement with the motor gear 656, the first and second partial gears 658-1, 658-2 may rotate in opposite rotational directions by meshing engagement with one of the motor gear 656 or idler gear 657. As a result, the reconfigurable finger assemblies 160 may rotate or pivot in opposite rotational directions relative to each other, and also relative to the central assembly 110 and static finger assembly 140.

For individual reconfigurable finger assemblies 160, the structural plate 862 may comprise a plate, beam, surface, bracket, or other structural member to which the upper coupling bracket 861-1 and the lower coupling bracket 861-2 may be coupled. In addition, various other components of the reconfigurable finger assembly 160 as further described herein may be coupled, directly or indirectly, to portions of the structural plate 862.

FIG. 9 is another schematic, perspective view diagram 900 of an example reconfigurable finger assembly of a gripper, in accordance with implementations of the present disclosure. With the exception of the connections to the central assembly and actuation by the actuator and geartrain, the reconfigurable finger assembly is substantially similar to the static finger assembly as described herein at least with respect to FIG. 5, which illustrates a perspective view diagram of the components of the finger assemblies from an opposing perspective compared to FIG. 9.

As shown in FIG. 9, an example reconfigurable finger assembly 160 of a gripper system 102 may comprise an upper coupling bracket 861-1, a lower coupling bracket 861-2, a structural plate 862, a double acting pneumatic actuator 863 and piston 864, a rack 865, a gear 866, a plurality of linkages 867, a plurality of first joints 868, linkage brackets 869, 870, a plurality of second joints 871, and a grasping finger 872.

The double acting pneumatic actuator 863 may comprise a cylinder and piston 864 that can be actuated between a retracted position and an extended position by applying air pressure to a first side of the cylinder and piston 864 or by applying air pressure to a second opposite side of the cylinder and piston 864. The double acting pneumatic actuator 863 may be coupled to the structural plate 862, and also coupled to an air pressure source at each of the first and second sides of the cylinder and piston 864, e.g., via one or more pneumatic lines. The desired air pressures to be applied to the cylinder and piston 864 may be determined or selected based on an identification of an item to be grasped and various associated characteristics described herein. Further details of the operation of an air pressure source and double acting pneumatic actuators having cylinders and associated pistons are described herein at least with respect to FIGS. 11-12B.

The piston 864 of the double acting pneumatic actuator 863 may be coupled to the rack 865, which is partially visible in FIG. 9. The rack 865 may comprise a substantially flat set of gear teeth that are configured to mesh with and cause rotation of the gear 866, similar to a rack-and-pinion arrangement. Because the rack 865 is coupled to the piston 864 of the double acting pneumatic actuator 863, upon movement of the piston 864 to a retracted position, the rack 865 may move upward with retraction of the piston 864 and cause corresponding rotational movement of the gear 866 due to the meshing teeth between the rack 865 and the gear 866. Likewise, upon movement of the piston 864 to an extended position, the rack 865 may move downward with extension of the piston 864 and cause corresponding rotational movement of the gear 866 due to the meshing teeth between the rack 865 and the gear 866.

The gear 866 may comprise a spur gear, helical gear, or other types of gears having teeth that are configured to mate with teeth of the rack 865. The gear 866 may be freely or passively rotatably coupled between linkage brackets 869, 870, which may comprise plates, beams, surfaces, or other structural members. In addition, the linkage brackets 869, 870 may be coupled to portions of the structural plate 862. As a result, the gear 866 may be held in position relative to the linkage brackets 869, 870 and the structural plate 862, and the gear 866 may freely or passively rotate responsive to substantially vertical movement of the rack 865 due to meshing teeth between the gear 866 and rack 865.

The plurality of linkages 867 may comprise beams, rods, poles, or other structural members that are coupled to the plurality of first joints 868 of the linkage brackets 869, 870 at first ends of the linkages 867, and that are coupled to the plurality of second joints 871 of portions of the grasping finger 872 at second ends of the linkages 867. The linkages 867 may be straight, curved, angled, or include other shapes, sizes, or dimensions.

The first joints 868 and second joints 871 of the linkages 867 may each comprise rotatable or pivotable joints to enable rotational motion of the linkages 867 relative to the linkage brackets 869, 870 and relative to the grasping finger 872. For example, at first ends of the linkages 867 proximate the linkage brackets 869, 870, a first linkage 867-1 coupled to a first lower joint 868-1 of the linkage brackets 869, 870 may be able to rotate or pivot around a substantially horizontal axis that extends through the first lower joint 868-1. In addition, a second linkage 867-2 coupled to a first intermediate joint 868-2 of the linkage brackets 869, 870 may be able to rotate or pivot around a substantially horizontal axis that extends through the first intermediate joint 868-2. Further, a third linkage 867-3 coupled to a first upper joint 868-3 of the linkage brackets 869, 870 may be able to rotate or pivot around a substantially horizontal axis that extends through the first upper joint 868-3.

In similar manner, at second ends of the linkages 867 proximate the grasping finger 872, a first linkage 867-1 coupled to a second lower joint 871-1 of the grasping finger 872 may be able to rotate or pivot around a substantially horizontal axis that extends through the second lower joint 871-1. In addition, a second linkage 867-2 coupled to a second intermediate joint 871-2 of the grasping finger 872 may be able to rotate or pivot around a substantially horizontal axis that extends through the second intermediate joint 871-2. Further, a third linkage 867-3 coupled to a second upper joint 871-3 of the grasping finger 872 may be able to rotate or pivot around a substantially horizontal axis that extends through the second upper joint 871-3.

In example embodiments, the linkages 867, first joints 868, and second joints 871 may form a parallel linkage mechanism that can move the grasping finger 872 from a raised, retracted position, as shown in FIG. 9, to a lowered, extended position, responsive to rotation of the linkages 867 downward in a counter-clockwise direction around first joints 868 with respect to FIG. 9. In addition, the parallel linkage mechanism can move the grasping finger 872 from a lowered, extended position to a raised, retracted position, as shown in FIG. 9, responsive to rotation of the linkages 867 upward in a clockwise direction around first joints 868 with respect to FIG. 9. Because the linkages 867, first joints 868, and second joints 871 may form a parallel linkage mechanism, the vertical orientation of the grasping finger 872 may remain substantially unchanged or unrotated in each of the raised, retracted position and the lowered, extended position, as well as all intermediate positions therebetween.

In addition, the first joints 868-1, 868-2, 868-3 may be positioned in a triangular configuration or arrangement on or between the linkage brackets 869, 870, and the second joints 871-1, 871-2, 871-3 may also be positioned in a similar or identical triangular configuration or arrangement on the grasping finger 872. The three linkages 867 coupled at first and second ends thereof to respective first and second joints 868, 871 in a triangular configuration or arrangement may prevent binding, overlapping, criss-crossing, or other unintentional movements of the linkages 867 relative to each other so that the parallel linkage mechanism described herein may reliably and continuously move between the retracted and extended positions, as well as all intermediate positions therebetween.

Furthermore, the third linkage 867-3 may be coupled to or integrally formed with the gear 866, such that the third linkage 867-3 is rotationally fixed together with the gear 866. As a result, responsive to rotation of the gear 866 by movement of the rack 865, the third linkage 867-3 may move in corresponding manner with the rotation of the gear 866. Because the linkages 867, first joints 868, and second joints 871 may form a parallel linkage mechanism, movement of the third linkage 867-3 responsive to rotation of the gear 866 may also cause corresponding movement of the first and second linkages 867-1, 867-2, and corresponding movement of the grasping finger 872 that is coupled to second ends of the linkages 867.

In addition, the reconfigurable finger assembly 160 may be considered underactuated because only one linkage, e.g., third linkage 867-3, may be actuated to move or rotate around the first upper joint 868-3 responsive to movement of the gear 866, which then causes corresponding movement of the entire parallel linkage mechanism based on the fixed relative positions of the first joints 868, second joints 871, and linkages 867 connected therebetween. Moreover, by underactuating the parallel linkage mechanism, the parallel linkage mechanism may exhibit an improved or greater degree of compliance, flexibility, and/or backdrivability during grasping of an item by the finger assemblies. In contrast, other example embodiments that are not underactuated may actuate multiple or all of the linkages around respective joints to move the parallel linkage mechanism.

The grasping finger 872 may comprise a beam, plate, surface, or other grasping component that is configured to contact and apply pressures or forces to grasp an item. In addition, the grasping finger 872 may have a thin, elongated, vertical shape or profile in order to be able to grasp an item from a set or group of items, e.g., an organized set of items or a cluttered or unorganized mix or combination of items. The thin, elongated, vertical shape or profile may also increase the surface area of contact between the grasping finger 872 and an item to ensure reliable grasping. Moreover, the thin, elongated, vertical shape or profile may reduce an overall size or profile of the gripper system 102 when the finger assemblies are in retracted positions, e.g., for storage or when not in use. Further, portions of the grasping finger 872 that contact an item may also include foam, rubber, silicone, or other compliant, flexible, or compressible materials to increase friction, prevent damage, and/or facilitate grasping of items.

Although FIGS. 1-9 illustrate a particular number, configuration, and arrangement of assemblies and components of an example gripper system, other example embodiments may include various other numbers, configurations, or arrangements of the various assemblies and components. For example, various other numbers, configurations, and arrangements of static finger assemblies and/or reconfigurable finger assemblies may be included, the finger assemblies, parallel linkage mechanisms, and grasping fingers may have various other sizes, shapes, or configurations, various other types of actuators may be used to move or rotate reconfigurable finger assemblies, such as motors, servos, solenoids, pneumatic cylinders, or other types of actuators, various other types of motion transfer systems may be used instead of a geartrain, such as direct drive systems, pulley systems, rack and pinion systems, screw or worm gear systems, or other types of motion transfer systems, various other types of actuators may be used to extend or retract suction cups and/or grasping fingers, and/or various other modifications may be made to the example gripper system described herein.

Using the example gripper system described herein, various modes of operation may be selected to grasp an item. For example, a first mode may comprise using only the suction cup assembly to grasp an item using suction or vacuum pressure via the suction cup. In addition, a second mode may comprise using only the finger assemblies to grasp an item using the grasping fingers to grip and/or envelope the item. Further, a third mode may comprise using a combination of both the suction cup assembly and the finger assemblies to grasp an item.

In some examples, the third mode may include further combinations, such as initially grasping an item using the suction cup and subsequently gripping and/or enveloping the item using the finger assemblies, or conversely, initially grasping an item using the finger assemblies and subsequently grasping the item using the suction cup. In other examples, the third mode may include additional combinations, such as initially grasping an item using the suction cup, subsequently gripping and/or enveloping the item using the finger assemblies, and then releasing the item from the suction cup while still grasping the item using the finger assemblies, or conversely, initially grasping an item using the finger assemblies, subsequently grasping the item using the suction cup, and then releasing the item from the finger assemblies while still grasping the item using the suction cup.

Various other combinations of suction or vacuum, gripping, and/or enveloping may be used to grasp an item, including various orders or sequences of applying suction or vacuum, gripping, and/or enveloping, as well as removing suction or vacuum, gripping, and/or enveloping, in order to grasp, transport, and release the item. Further, the determination or selection of a desired mode to grasp an item may be determined based on various characteristics associated with items described herein, such as different dimensions, shapes, weights, materials, friction, flexibility, rigidity, or other characteristics.

Figure 10A:
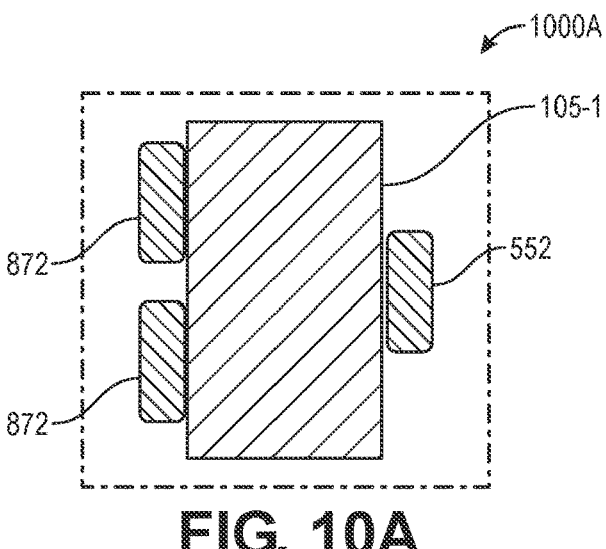
FIGS. 10A-10C are schematic, plan view diagrams of example grasping modes of a gripper, in accordance with implementations of the present disclosure.
Figure 10B:
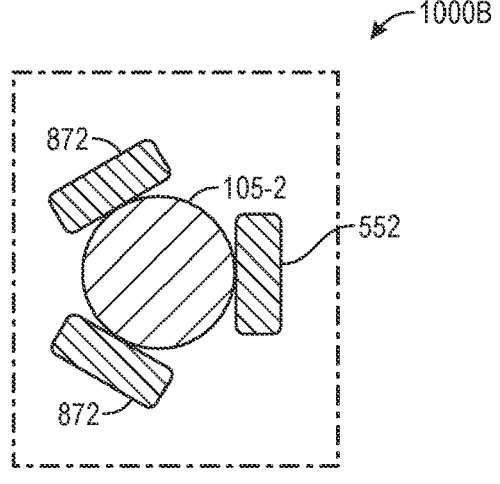
Figure 10C:
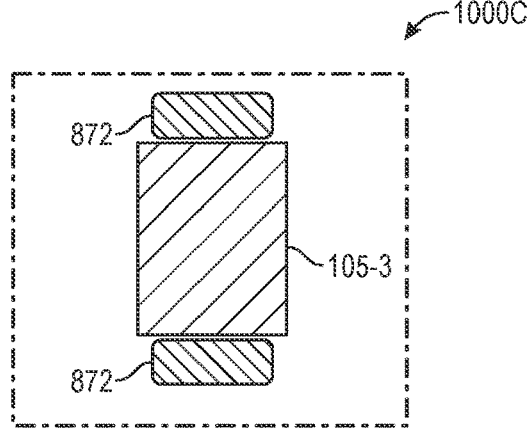

FIGS. 10A-10C are schematic, plan view diagrams 1000A, 1000B, 1000C of example grasping modes of a gripper, in accordance with implementations of the present disclosure.

As shown in FIGS. 10A-10C, various grasping modes or finger configurations may be selected to grasp an item using the finger assemblies. The determination or selection of a desired finger configuration to grasp an item may be determined based on various characteristics associated with items described herein, such as different dimensions, shapes, weights, materials, friction, flexibility, rigidity, or other characteristics.

In the plan view of FIG. 10A, a first item 105-1 may be grasped using a first finger configuration, which may be an offset opposed finger configuration. The illustration of FIG. 1 may generally correspond to the offset opposed finger configuration upon movement of the static and reconfigurable finger assemblies to respective lowered, extended positions. In the lowered, extended positions of the static and reconfigurable finger assemblies, a grasping finger 552 of the static finger assembly may apply pressure or force to a first side of the first item 105-1, e.g., a right side in FIG. 10A, and the two grasping fingers 872 of the reconfigurable finger assemblies may apply pressure or force to a second, opposite side of the first item 105-1, e.g., a left side in FIG. 10A. The grasping fingers 552, 872 together may apply desired pressures or forces to the first item 105-1 to reliably grasp, transport, and release the item. As further described herein, the desired pressure or forces may also be determined or selected based on various characteristics associated with items, such as different dimensions, shapes, weights, materials, friction, flexibility, rigidity, or other characteristics.

In the plan view of FIG. 10B, a second item 105-2 may be grasped using a second finger configuration, which may be a radial finger configuration. The radial finger configuration may be formed by partially rotating, by the actuator and geartrain, each of the two reconfigurable finger assemblies relative to the central assembly and static finger assembly, e.g., approximately 60 degrees relative to their positions in the offset opposed finger configuration. As a result, the two reconfigurable finger assemblies may be partially rotated in opposite rotational directions relative to each other. In the lowered, extended positions of the static finger assembly and the partially rotated reconfigurable finger assemblies, a grasping finger 552 of the static finger assembly may apply pressure or force to a first radial side of the second item 105-2, e.g., a right side in FIG. 10B, a first grasping finger 872 of a first reconfigurable finger assembly may apply pressure or force to a second, radial side of the second item 105-2, e.g., an upper left side in FIG. 10B, and a second grasping finger 872 of a second reconfigurable finger assembly may apply pressure or force to a third, radial side of the second item 105-2, e.g., a lower left side in FIG. 10B. The grasping fingers 552, 872 together may apply desired pressures or forces to the second item 105-2 to reliably grasp, transport, and release the item. As further described herein, the desired pressure or forces may also be determined or selected based on various characteristics associated with items, such as different dimensions, shapes, weights, materials, friction, flexibility, rigidity, or other characteristics.

In the plan view of FIG. 10C, a third item 105-3 may be grasped using a third finger configuration, which may be an in-line opposed finger configuration. The in-line opposed finger configuration may be formed by fully rotating, by the actuator and geartrain, each of the two reconfigurable finger assemblies relative to the central assembly and static finger assembly, e.g., approximately 90 degrees relative to their positions in the offset opposed finger configuration. As a result, the two reconfigurable finger assemblies may be fully rotated in opposite rotational directions relative to each other. In this third finger configuration, the static finger assembly may not be used to grasp the item. Then, in the lowered, extended positions of the fully rotated reconfigurable finger assemblies, a first grasping finger 872 of a first reconfigurable finger assembly may apply pressure or force to a first side of the third item 105-3, e.g., an upper side in FIG. 10C, and a second grasping finger 872 of a second reconfigurable finger assembly may apply pressure or force to a second side of the third item 105-3, e.g., a lower side in FIG. 10C. The grasping fingers 872 together may apply desired pressures or forces to the third item 105-3 to reliably grasp, transport, and release the item. As further described herein, the desired pressure or forces may also be determined or selected based on various characteristics associated with items, such as different dimensions, shapes, weights, materials, friction, flexibility, rigidity, or other characteristics.

Various other finger configurations may also be determined, selected, and/or formed that may differ from the illustrated examples. For example, the reconfigurable finger assemblies may be rotated by different amounts than described herein, in order to form different finger configurations to grasp various types of items having variable characteristics. Furthermore, for example gripper systems having different numbers, configurations, or arrangements of static and/or reconfigurable finger assemblies, further combinations of finger configurations may be possible using some or all of such finger assemblies.

Figure 11:
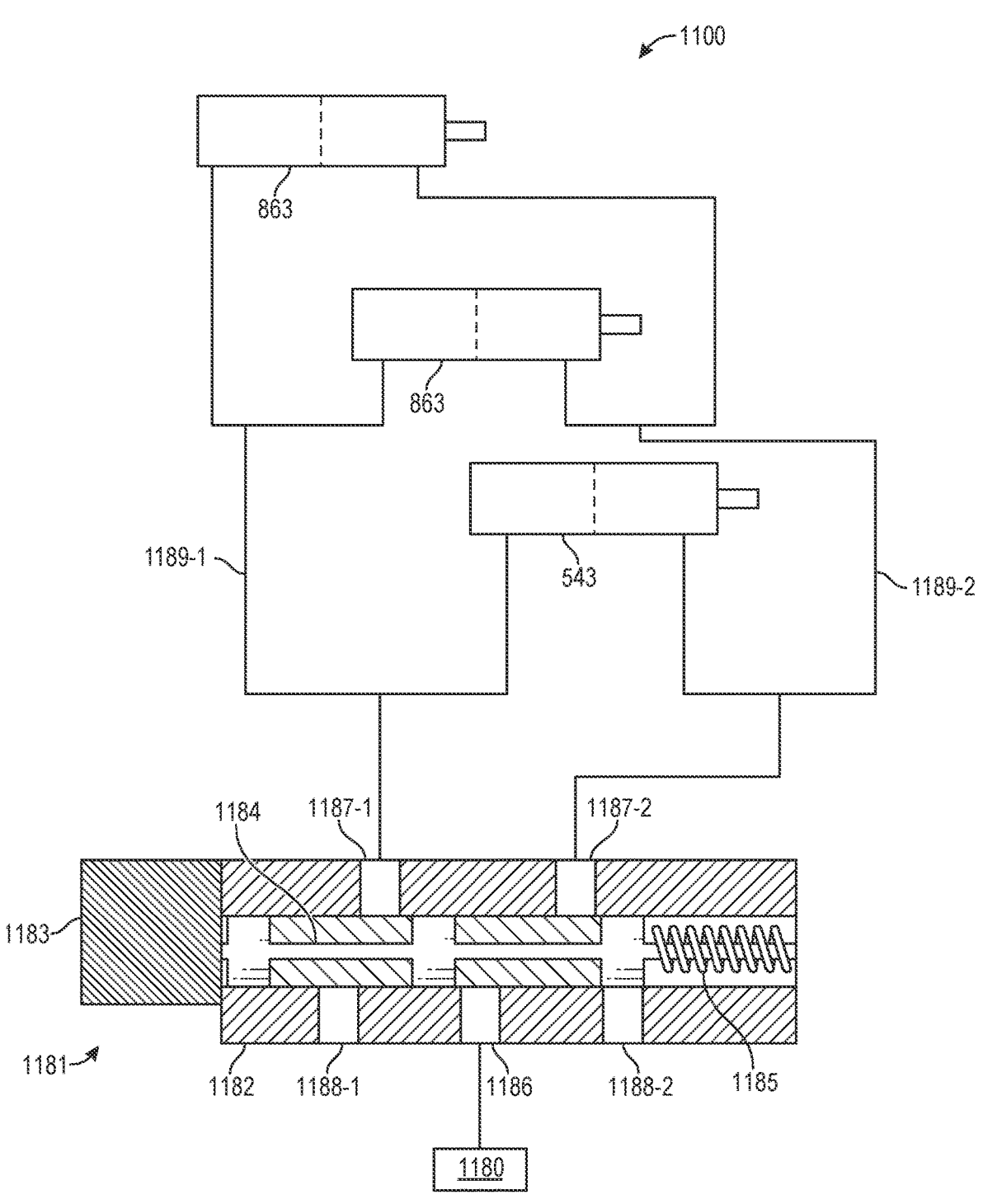
FIG. 11 is a schematic diagram of an example pressure-regulated actuation assembly of a gripper, in accordance with implementations of the present disclosure.

FIG. 11 is a schematic diagram 1100 of an example pressure-regulated actuation assembly of a gripper, in accordance with implementations of the present disclosure.

The example pressure-regulated actuation assembly of FIG. 11 may be used to actuate one or more of the double acting pneumatic actuators described herein. For example, the pressure-regulated actuation assembly may actuate the double acting pneumatic actuators 543, 863 of the static finger assembly and/or the reconfigurable finger assemblies. In addition, the pressure-regulated actuation assembly may actuate the double acting pneumatic actuators 218 of the suction cup assembly, e.g., for extension and retraction of the suction cup.

As shown in FIG. 11, the example pressure-regulated actuation assembly may comprise an air pressure source 1180, a control valve 1181 or other similar component, and one or more pneumatic lines 1189 that connect to portions, ends, or sides of the double acting pneumatic actuators.

The air pressure source 1180 may be any type or form of source that can provide air pressure at desired pressures. The air pressure source 1180 may provide air at a desired or selected pressure to one or more double acting pneumatic actuators via the control valve 1181 and pneumatic lines 1189.

The control valve 1181 may comprise various types of solenoids, valves, or other air flow control components. In example embodiments, the control valve 1181 may comprise a 5/2 solenoid having a body 1182, actuation coil 1183, piston 1184, spring 1185, and a plurality of ports 1186, 1187, 1188. In particular, the 5/2 solenoid may include five ports 1186, 1187, 1188 and two positions of the piston 1184 responsive to actuation or movement by the actuation coil 1183 and spring 1185.

The body 1182 of the control valve 1181 may comprise a cylinder or other similar elongated body. The body 1182 may also include a plurality of ports, including a source or input port 1186, a first output port 1187-1, a second output port 1187-2, a first exhaust port 1188-1, and a second exhaust port 1188-2. The air pressure source 1180 may be communicatively coupled to the source port 1186 to provide air pressure to the double acting pneumatic actuators via the pneumatic lines 1189. A first set of pneumatic lines 1189-1 may be communicatively coupled to the first output port 1187-1 to provide air pressure from the source 1180 to first ends of the double acting pneumatic actuators. In addition, a second set of pneumatic lines 1189-2 may be communicatively coupled to the second output port 1187-2 to provide air pressure from the source 1180 to second ends of the double acting pneumatic actuators. Further, the first exhaust port 1188-1 may allow release of air from the first ends of the double acting pneumatic actuators to atmosphere, and the second exhaust port 1188-2 may allow release of air from the second ends of the double acting pneumatic actuators to atmosphere.

The piston 1184 may be received within a hole, channel, or recess within the body 1182, and the piston 1184 may move between at least two positions, e.g., an actuated position and an unactuated position, or an extended position and a retracted position. The actuation coil 1183 may be activated to cause the piston 1184 to move within the channel in a first direction toward the spring 1185, thereby compressing the spring. Upon deactivation of the actuation coil 1183, the piston 1184 may move within the channel in a second opposite direction away from the spring 1185 responsive to the spring force of the spring 1185.

In addition, the piston 1184 may be formed to have portions with smaller radii or dimensions that allow air flow around the piston 1184 within the body 1182, as well as other portions with larger radii or dimensions that substantially block air flow around the piston 1184 within the body 1182. The blocking portions of the piston 1184 may move relative to the various ports 1186, 1187, 1188 with the different positions of the piston 1184, in order to selectively supply air flow from the source port 1186 to portions of the double acting pneumatic actuators via one of the output ports 1187, and also to selectively exhaust or vent air from portions of the double acting pneumatic actuators to one of the exhaust ports 1188 via one of the output ports 1187. Further details of the operation of the control valve 1181 are described herein at least with respect to FIGS. 12A and 12B.

Although FIG. 11 illustrates a combined actuation of multiple double acting pneumatic actuators by a single pressure-regulated actuation assembly, other example embodiments may include other numbers, configurations, or arrangements of one or more pressure-regulated actuation assemblies that actuate one or more double acting pneumatic actuators. For example, the double acting pneumatic actuator of the static finger assembly may be independently actuated by a first pressure-regulated actuation assembly, and the double acting pneumatic actuators of the plurality of reconfigurable finger assemblies may be actuated together by a second pressure-regulated actuation assembly. Alternatively, each reconfigurable finger assembly may also be actuated independently by respective pressure-regulated actuation assemblies. Various other combinations, configurations, or arrangements of pressure-regulated actuation assemblies and associated double acting pneumatic actuators may also be possible.

Figure 12A:
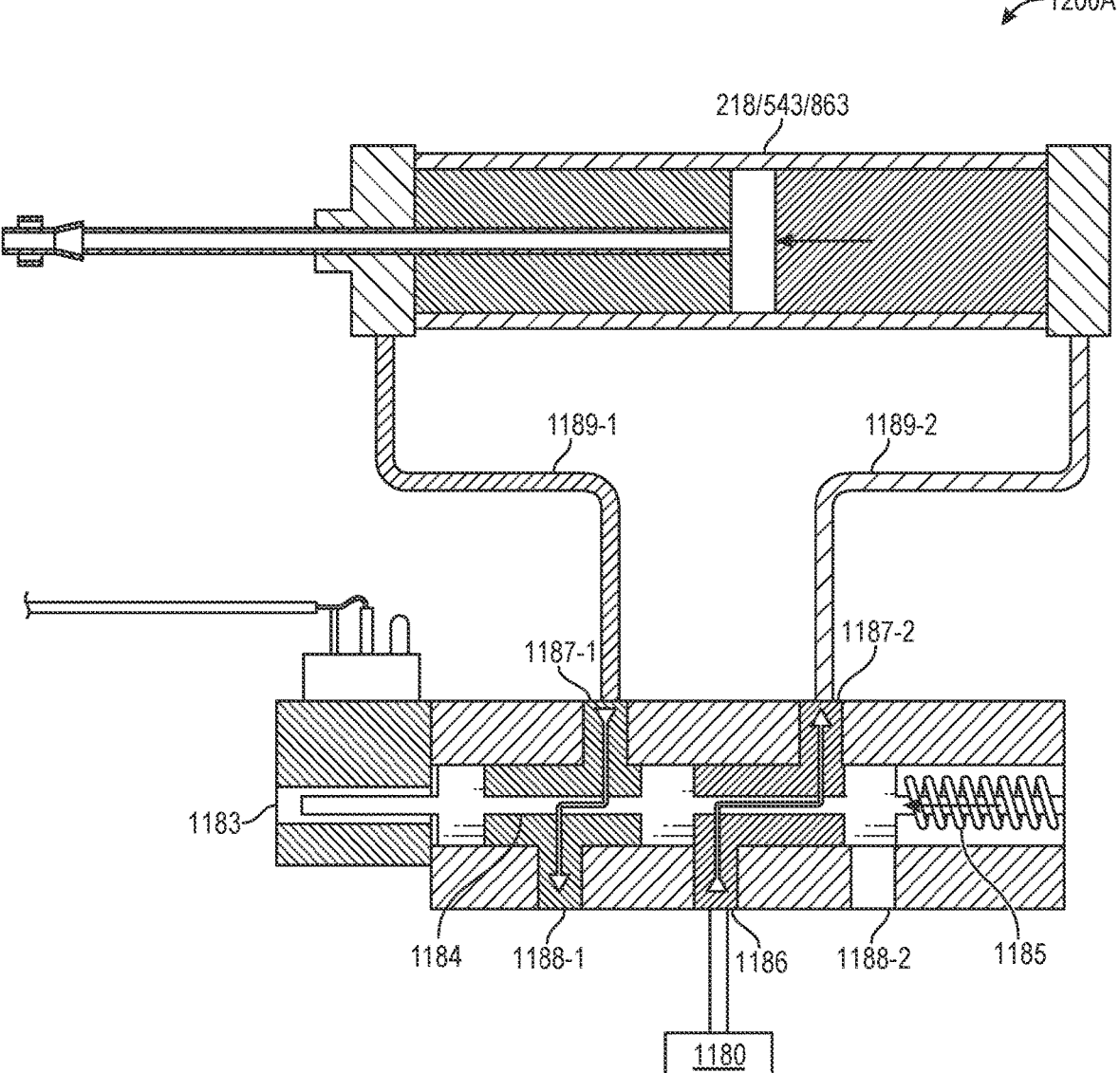
FIGS. 12A and 12B are schematic diagrams of example actuation positions of a pressure-regulated actuation assembly of a gripper, in accordance with implementations of the present disclosure.
Figure 12B:
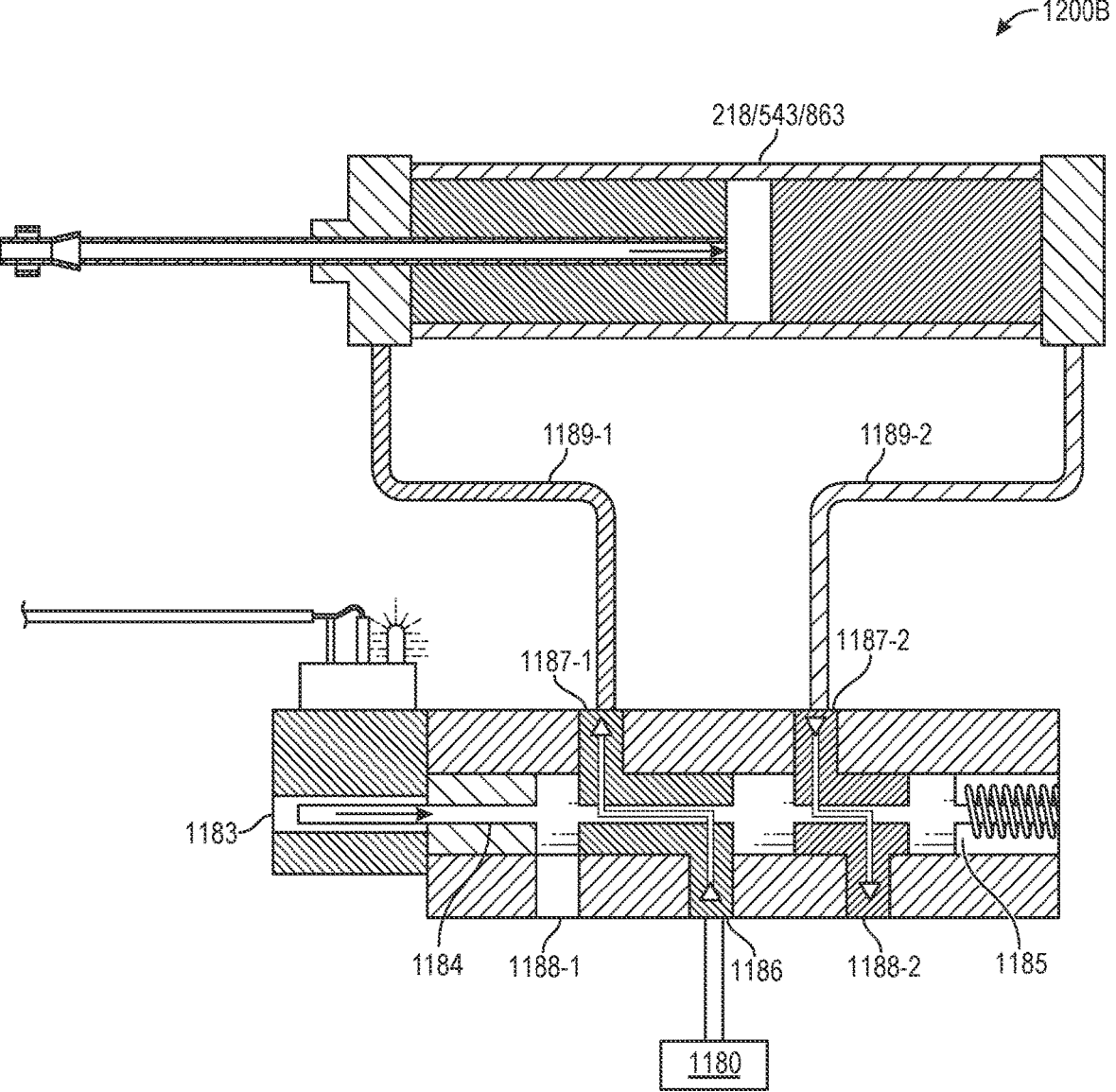

FIGS. 12A and 12B are schematic diagrams 1200A, 1200B of example actuation positions of a pressure-regulated actuation assembly of a gripper, in accordance with implementations of the present disclosure.

As shown in FIG. 12A, a first position of the pressure-regulated actuation assembly is illustrated. In the first position, the piston 1184 may be in a retracted or unactuated position in which the actuation coil 1183 is not actuated to move or extend the piston 1184. As a result, the piston 1184 remains in the retracted position due to the spring force exerted on the piston by the spring 1185, as shown in FIG. 12A.

In the retracted position, the blocking portions of the piston 1184 may be positioned in the channel relative to the ports to allow fluid communication between a particular combination of the ports. For example, an air pressure source 1180 that is coupled to the source port 1186 may supply air at a desired pressure, and due to the positions of the blocking portions of the piston 1184, the air flow from the source 1180 may be in fluid communication with and directed toward the second output port 1187-2, along the second pneumatic line 1189-2, and toward a second end of one or more double acting pneumatic actuators 218/543/863. As a result, air at a desired pressure from the source 1180 may be supplied to the second end of one or more double acting pneumatic actuators.

Furthermore, in the retracted position, due to the positions of the blocking portions of the piston 1184, first exhaust port 1188-1 may be in fluid communication with the first output port 1187-1, which is in fluid communication with a first end of one or more double acting pneumatic actuators 218/543/863 via the first pneumatic line 1189-1. As a result, air at the first end of one or more double acting pneumatic actuators may be exhausted or vented out to atmosphere via the first exhaust port 1188-1, such that the first end of the one or more double acting pneumatic actuators may substantially return to atmospheric pressure.

Based on the pressure differential between the air at a desired pressure from the source 1180 that is supplied to the second end of the one or more double acting pneumatic actuators, and the atmospheric pressure of the first end of the one or more double acting pneumatic actuators, the double acting pneumatic actuators 218/543/863 may be actuated to move away from the second end and toward the first end, e.g., toward a left side of FIG. 12A. Such movement may correspond to extension of the double acting pneumatic actuators, and corresponding movement, e.g., extension, of the suction cup, and/or corresponding movement, e.g., raising or retraction, of the finger assemblies.

As shown in FIG. 12B, a second position of the pressure-regulated actuation assembly is illustrated. In the second position, the piston 1184 may be in an extended or actuated position in which the actuation coil 1183 is actuated to move or extend the piston 1184. As a result, the piston 1184 may move to the extended position against the spring force exerted on the piston by the spring 1185, as shown in FIG. 12B.

In the extended position, the blocking portions of the piston 1184 may also be positioned in the channel relative to the ports to allow fluid communication between a particular combination of the ports. For example, an air pressure source 1180 that is coupled to the source port 1186 may supply air at a desired pressure, and due to the positions of the blocking portions of the piston 1184, the air flow from the source 1180 may be in fluid communication with and directed toward the first output port 1187-1, along the first pneumatic line 1189-1, and toward a first end of one or more double acting pneumatic actuators 218/543/863. As a result, air at a desired pressure from the source 1180 may be supplied to the first end of one or more double acting pneumatic actuators.

Furthermore, in the extended position, due to the positions of the blocking portions of the piston 1184, the second exhaust port 1188-2 may be in fluid communication with the second output port 1187-2, which is in fluid communication with a second end of one or more double acting pneumatic actuators 218/543/863 via the second pneumatic line 1189-2. As a result, air at the second end of one or more double acting pneumatic actuators may be exhausted or vented out to atmosphere via the second exhaust port 1188-2, such that the second end of the one or more double acting pneumatic actuators may substantially return to atmospheric pressure.

Based on the pressure differential between the air at a desired pressure from the source 1180 that is supplied to the first end of the one or more double acting pneumatic actuators, and the atmospheric pressure of the second end of the one or more double acting pneumatic actuators, the double acting pneumatic actuators 218/543/863 may be actuated to move away from the first end and toward the second end, e.g., toward a right side of FIG. 12B. Such movement may correspond to retraction of the double acting pneumatic actuators, and corresponding movement, e.g., retraction, of the suction cup, and/or corresponding movement, e.g., lowering or extension, of the finger assemblies.

In some example embodiments, the couplings or communications between the ports of the control valve 1181 and first or second ends of the double acting pneumatic actuators may be configured in order to move, position, and/or retain the suction cup assembly and/or finger assemblies in desired positions in the unactuated state of the control valve 1181. For example, in the unactuated state of the control valve 1181, the suction cup may be in a retracted position, and the finger assemblies may be in the raised or retracted positions, thereby reducing an overall size or profile of the gripper system in the unactuated state. Further, particular desired positions of the suction cup assembly and/or finger assemblies in an unactuated state of the control valve 1181 may also be selected to ensure safety of personnel in proximity to the gripper system.

By connecting multiple pneumatic lines via junctions or splitters to the output ports 1187 of the control valve 1181, e.g., as schematically shown in FIG. 11, multiple double acting pneumatic actuators may be simultaneously or concurrently controlled via a single air pressure source 1180 and single control valve 1181. In some examples, the combined control of multiple double acting pneumatic actuators by a single source 1180 and control valve 1181 may enable simultaneous or concurrent extension of all static and reconfigurable finger assemblies, as well as simultaneous or concurrent retraction of all static and reconfigurable finger assemblies. In additional examples, only reconfigurable finger assemblies may be simultaneously or concurrently controlled by a single source 1180 and control valve 1181. In further examples, the extension and retraction of the suction cup assembly may also be simultaneously or concurrently controlled with one or more finger assemblies by the single source 1180 and control valve 1181.

In other example embodiments, individual double acting pneumatic actuators may be independently or individually controlled by respective air pressure sources and associated control valves. For example, a first source and associated control valve may control operation of a static finger assembly, a second source and associated control valve may control operation of a first reconfigurable finger assembly, a third source and associated control valve may control operation of a second reconfigurable finger assembly, and a fourth source and associated control valve may control operation of a suction cup assembly, etc.

Using one or more pressure-regulated actuation assemblies as described herein, a desired air pressure for air supplied from a source may be determined or selected in order to generate a desired pressure differential. In the examples illustrated herein, because either side of the double acting pneumatic actuators may be selectively vented and open to atmosphere, the air supplied from the source may generate a pressure differential between the two sides of the double acting pneumatic actuators relative to atmospheric pressure.

In addition, the generated pressure differentials may be determined or selected to generate desired pinching or grasping forces by the finger assemblies, e.g., by the grasping fingers upon items that are grasped. Thus, the grasping forces to be generated and the corresponding pressure differentials that are to be generated by the pressure-regulated actuation assemblies may be selected or determined based on the various characteristics of items to be grasped. For example, the grasping forces and corresponding pressure differentials may be selected to ensure reliable grasping of items, prevent dropping of items, and/or reduce or avoid damage to items from excessive grasping forces.

In addition, by using the pressure-regulated actuation assemblies and double acting pneumatic actuators to grasp or pinch items using the finger assemblies, the grasping of items by the finger assemblies may be controlled substantially on the basis of applied pressure or forces, rather than on the basis of particular positions of the finger assemblies or predetermined gaps between the finger assemblies. For example, the finger assemblies may be actuated to apply desired forces to an item regardless of the particular resultant grasping positions of the finger assemblies, instead of being actuated to move to desired or predetermined positions relative to each other. With such pressure-regulated operation described herein, the finger assemblies may grasp various items having different sizes and/or shapes with substantially desired or selected applied forces, even if the resultant grasping positions of the finger assemblies for the various items may be different from each other.

Further, because of the pressure-regulated operation of the finger assemblies, potentially in combination with the underactuated nature of the parallel linkage mechanisms, the finger assemblies may exhibit backdrivability or compliance when grasping items. Because the finger assemblies are actuated to apply desired forces to an item without positively controlling movement of the finger assemblies to particular positions and/or predetermined gaps therebetween, the finger assemblies may be backdrivable upon receiving or exerting opposing forces upon the finger assemblies that are greater than the applied forces by the pressure-regulated actuation assemblies and double acting pneumatic actuators. As a result, the finger assemblies may exhibit or include a degree of compliance upon grasping items that may depend on the applied forces, characteristics related to the compressibility of air, and various characteristics of the items.

Moreover, in some example embodiments, the desired air pressure for air supplied from a source may be varied or modified during extension or retraction of the finger assemblies. For example, the torque applied to the pneumatic actuators by the weight of the finger assemblies may vary for different positions of the finger assemblies, e.g., a fully retracted position, a partially extended position, a fully extended position, and/or other positions. Thus, the desired air pressure may be varied based on the varying torque associated with different positions of the finger assemblies in order to generate the desired forces on a grasped item. Further, the desired air pressure may be varied in order to provide a smooth or steady operation or motion of the finger assemblies between the retracted and extended positions, or other positions. The variable air pressures applied to the finger assemblies between retracted and extended positions may be referred to as pressure trajectories. In addition to weight or torque of the friction assemblies, friction or various other external forces associated with the friction assemblies may also be taken into account when determining or selecting desired air pressure trajectories to be supplied from a source to generate desired forces to grasp an item.

In further example embodiments, the pressure-regulated actuation assemblies and double acting pneumatic actuators may select desired air pressures in order to set or select various pre-pinch widths, gaps, or poses of the finger assemblies in any of various finger configurations described herein. For example, in order to grasp an item from a group or set of items in proximity to each other, a pre-pinch width, gap, or pose between two or more finger assemblies may be determined or selected to position the finger assemblies around the item to be grasped and also between or among other items that are not to be grasped. In order to achieve a desired pre-pinch width, gap, or pose between finger assemblies, a desired air pressure may be selected to be supplied from a source that substantially balances the torque applied to the pneumatic actuators by the weight of the finger assemblies.

Thus, to achieve particular desired pre-pinch widths, gaps, or poses in some example embodiments, a selected air pressure may be supplied to move the finger assemblies away from the lowered, extended position and toward the raised, retracted position that is counterbalanced by the torque applied to the pneumatic actuators by the weight of the finger assemblies. In this manner, various pre-pinch widths, gaps, or poses may be set or selected for two or more finger assemblies using the pressure-regulated actuation assemblies and double acting pneumatic actuators, even though the pressure-regulated actuation assemblies and double acting pneumatic actuators may not necessarily cause actuation of the finger assemblies to particular positively determined or selected positions or gaps therebetween.

Figure 13:
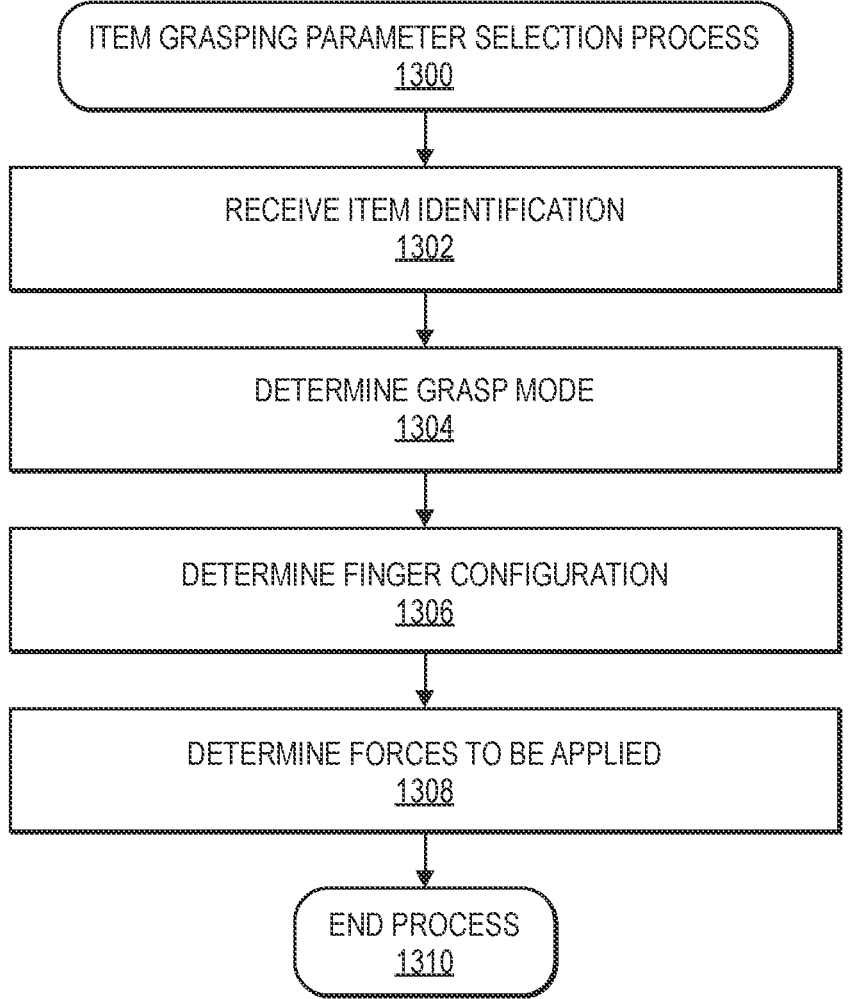
FIG. 13 is a flow diagram illustrating an example item grasping parameter selection process, in accordance with implementations of the present disclosure.

FIG. 13 is a flow diagram illustrating an example item grasping parameter selection process 1300, in accordance with implementations of the present disclosure.

The process 1300 may begin by receiving an item identification, as at 1302. For example, a perception system, such as cameras, scanners, or other item identification systems, may detect and identify an item to be grasped by the gripper or gripping system. In some examples, the perception system may detect numbers, codes, symbols, or other identifiers associated with an item to identify the item. In other examples, the perception system may capture imaging data of an item to identify the item, e.g., using various image or feature recognition algorithms or techniques. As described herein, the various types of items may have various characteristics, such as different dimensions, shapes, weights, materials, friction, flexibility, rigidity, or other characteristics. In some examples, the variable types of items may include different types of shapes, such as rectangular prisms, cylinders, spheres or balls, substantially flat or planar, symmetric, asymmetric, uneven, odd, or deformable shapes, or others, different types of containers, such as boxes, bags, bottles, packaged, unpackaged, or others, different types of materials, such as metals, plastics, films, paper, cardboard, fabrics, glass, or others, and/or different types of structural strength, such as rigid, flexible, compressible, deformable, fragile, or others.

In addition, a pick location, pick point, pick trajectory, pre-pinch pose, and/or various other grasping characteristics related to grasping the item may be determined based on the identified item, which grasping characteristics may be learned over time based on data related to successful or unsuccessful grasping operations for the same or similar items, e.g., using various machine learning models or methods. Further, a control system may receive an item identification of an item.

The process 1300 may continue by determining a grasp mode, as at 1304. For example, based on the item identification and various characteristics related to grasping the identified item, a grasp mode may be selected or determined. The grasp mode may comprise grasping the item using suction or vacuum, grasping the item using two or more finger assemblies, and/or various combinations or sequences thereof. In addition, the grasp mode associated with an identified item may also be learned over time based on data related to successful or unsuccessful grasping operations for the same or similar items via various grasp modes, e.g., using various machine learning models or methods. Further, a control system may determine a grasp mode to grasp an item.

The process 1300 may proceed by determining a finger configuration, as at 1306. For example, based on the item identification and various characteristics related to grasping the identified item, a finger configuration may be selected or determined. The finger configuration may comprise an offset opposed finger configuration, an in-line opposed finger configuration, a radial finger configuration, and/or various other finger configurations to grasp the identified item. In addition, the finger configuration associated with an identified item may also be learned over time based on data related to successful or unsuccessful grasping operations for the same or similar items via various finger configurations, e.g., using various machine learning models or methods. Further, a control system may determine a finger configuration to grasp an item.

The process 1300 may then continue to determine forces to be applied, as at 1308. For example, based on the item identification, various characteristics related to grasping the identified item, the selected grasp mode, and/or the selected finger configuration, forces to be applied to grasp the identified item may be selected or determined. For example, various suction or vacuum pressures or forces may be applied via a suction cup to grasp the item, and/or various forces may be applied by the grasping fingers to the identified item based on selected air pressures that are supplied to the finger assemblies and associated pneumatic actuators. In addition, the correlation between supplied air pressures and resultant forces applied to the identified item by the suction cup and/or grasping fingers may also be learned over time based on data related to successful or unsuccessful grasping operations for the same or similar items via various supplied air pressures, e.g., using various machine learning models or methods. Further, a control system may determine forces to be applied to grasp an item.

The process 1300 may then end, as at 1310.

Figure 14:
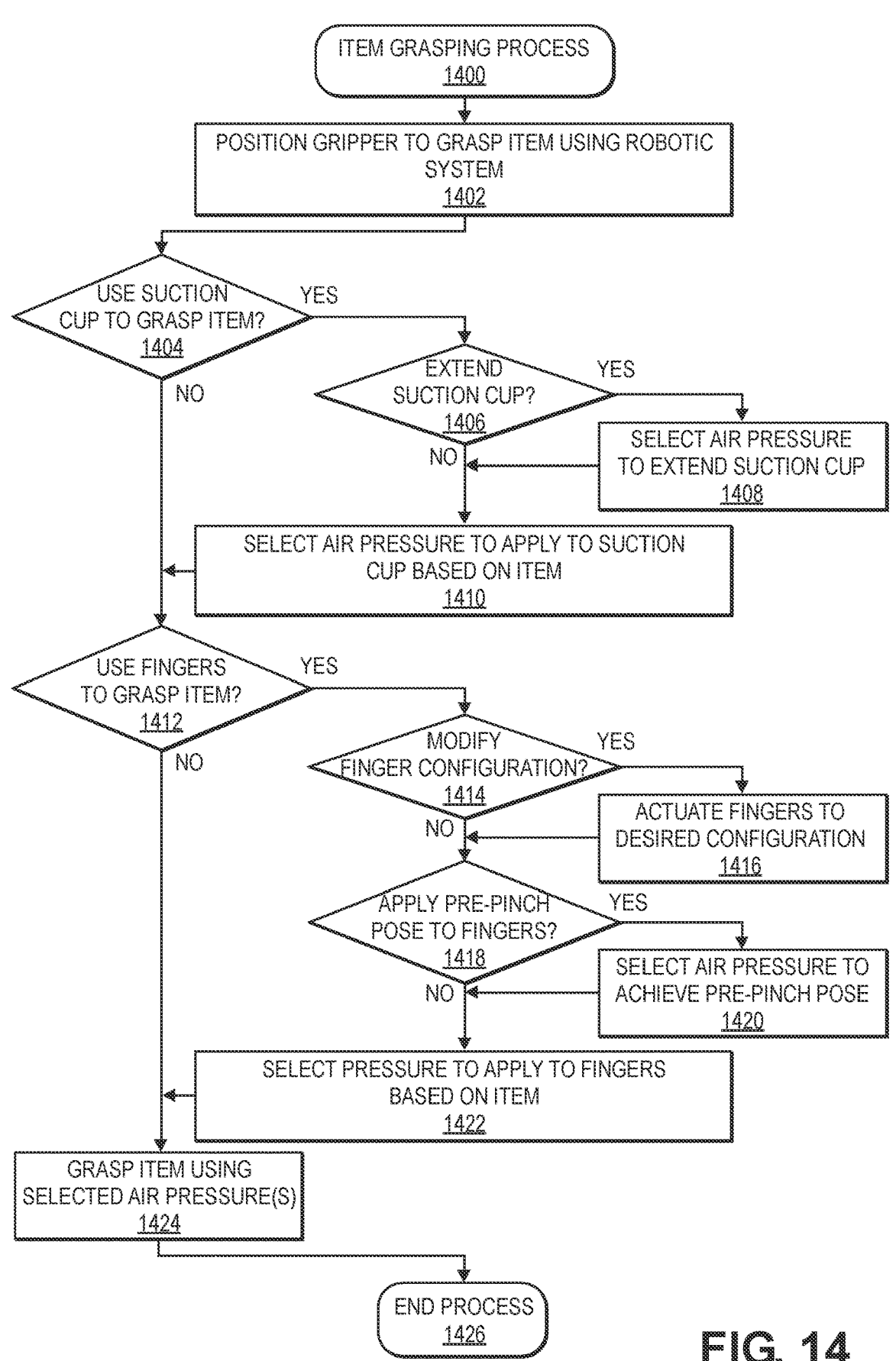
FIG. 14 is a flow diagram illustrating an example item grasping process, in accordance with implementations of the present disclosure.

FIG. 14 is a flow diagram illustrating an example item grasping process 1400, in accordance with implementations of the present disclosure.

The process 1400 may begin by positioning a gripper to grasp an item using a robotic system, as at 1402. For example, based on an identified item and various grasping parameters selected or determined for the identified item, as described at least with respect to FIG. 13, a robotic system, such as a gantry system, robotic arm, or other movement system, that is coupled to a gripper or gripping system may move, position, or orient the gripper system relative to the identified item to grasp the item. The robotic system may move the gripper system based on a determined pick location, pick point, pick trajectory, and/or various other characteristics to position or orient the gripper system to grasp the item. Further, a control system may instruct movement of the gripper system via the robotic system.

The process 1400 may continue by determining whether to use a suction cup to grasp the item, as at 1404. For example, based on the determined grasp mode, as described at least with respect to FIG. 13, it may be determined whether a suction cup assembly of the gripper system is to be used to grasp the identified item. Further, a control system may determine whether to use the suction cup to grasp the item.

If it is determined to use the suction cup to grasp the item, the process 1400 may proceed by determining whether to extend the suction cup, as at 1406. For example, in addition to a suction cup to apply vacuum or suction pressure or forces to seal with and grasp the item, the suction cup assembly may also include an actuator, e.g., a double acting pneumatic actuator, to extend or retract the suction cup relative to the gripper system and the identified item. Based on the determined grasp mode and/or various item characteristics, it may be determined whether to extend and/or retract the suction cup to grasp the item. Further, a control system may determine whether to extend and/or retract the suction cup.

If it is determined to extend and/or retract the suction cup to grasp the item, the process 1400 may then continue to select an air pressure to extend the suction cup, as at 1408. For example, the actuator associated with the suction cup assembly may extend or retract responsive to various air pressures supplied to the actuator. In some examples, the actuator may comprise a double acting pneumatic actuator, and different air pressures may be supplied to opposing sides or ends of the pneumatic actuator to cause extension or retraction of the suction cup assembly. Thus, desired air pressures, or desired air pressure differentials, may be selected to cause extension and/or retraction of the suction cup to grasp the item. Further, a control system may select the air pressures, or air pressure differentials, to extend and/or retract the suction cup.

After selecting the air pressures, or air pressure differentials, to extend and/or retract the suction cup at 1408, or alternatively, if it is determined at 1406 not to extend and/or retract the suction cup to grasp the item, the process 1400 may then proceed to select an air pressure to apply to the suction cup based on the item, as at 1410. For example, the suction cup may be coupled to a suction or vacuum source, and based on the determined grasp mode, various item characteristics, and/or determined forces to apply to the item, as described at least with respect to FIG. 13, a selected suction or vacuum air pressure may be selected to grasp the identified item. Further, a control system may select a suction or vacuum pressure to apply to the suction cup.

Subsequent to determining the air pressures, or air pressure differentials, to apply to portions of the suction cup assembly at 1406-1410, or alternatively, if it is determined at 1404 not to use the suction cup to grasp the item, the process 1400 may continue with determining whether to use grasping fingers to grasp the item, as at 1412. For example, based on the determined grasp mode, as described at least with respect to FIG. 13, it may be determined whether two or more grasping fingers of the gripper system are to be used to grasp the identified item. Further, a control system may determine whether to use the grasping fingers to grasp the item.

If it is determined to use the grasping fingers to grasp the item, the process 1400 may proceed with determining whether to modify a finger configuration, as at 1414. For example, various finger configurations may be used, such as an offset opposed finger configuration, an in-line opposed finger configuration, a radial finger configuration, and/or various other finger configurations. Based on the determined finger configuration and/or various item characteristics, as described at least with respect to FIG. 13, it may be determined whether to modify a finger configuration to grasp the item. Further, a control system may determine whether to modify a finger configuration.

If it is determined to modify the finger configuration, the process 1400 may continue by actuating fingers to the desired finger configuration, as at 1416. For example, two or more reconfigurable finger assemblies may be movable or rotatable relative to a remainder of the gripper system between various positions or orientations, e.g., via one or more actuators, geartrains, or other types of motors, actuators, and/or motion transfer systems. Based on the determined finger configuration, one or more reconfigurable finger assemblies may be moved or rotated to desired positions. Further, a control system may instruct movement or actuation of one or more fingers to a desired finger configuration.

After actuating one or more fingers to the desired finger configuration at 1416, or alternatively, if it is determined at 1414 not to modify the finger configuration to grasp the item, the process 1400 may then proceed by determining whether to apply a pre-pinch pose to the fingers, as at 1418. For example, based on the determined grasp mode, finger configuration, and/or various item characteristics, as described at least with respect to FIG. 13, two or more fingers may be actuated, or partially actuated, to achieve a pre-pinch pose between the fingers to assist in grasping the item. In some examples, an item to be grasped may be packaged or organized in proximity or adjacent to other items, and/or an item to be grasped may be within a mixed or cluttered group or set of items. In order to grasp the identified item, a pre-pinch pose of two or more fingers may be selected to fit or engage only the identified item from within a group or set of similar or different items. Further, a control system may determine whether to apply a pre-pinch pose to the fingers to grasp the item.

If it is determined to apply a pre-pinch pose to two or more fingers, the process may continue to select an air pressure to achieve the pre-pinch pose between the fingers, as at 1420. For example, two or more grasping fingers of the finger assemblies may be actuated, or partially actuated, to achieve a desired pre-pinch pose between the fingers. Actuators associated with the two or more grasping fingers may move the grasping fingers responsive to various air pressures supplied to the actuators. In some examples, the actuators may comprise double acting pneumatic actuators, and different air pressures may be supplied to opposing sides or ends of the pneumatic actuators to cause movement of grasping fingers of the finger assemblies, which may comprise parallel linkage mechanisms as described herein. Thus, desired air pressures, or desired air pressure differentials, may be selected to cause movement of finger assemblies to achieve a desired pre-pinch pose between two or more grasping fingers. Further, a control system may select the air pressures, or air pressure differentials, to move the grasping fingers.

After selecting the air pressures, or air pressure differentials, to achieve the pre-pinch pose at 1420, or alternatively, if it is determined at 1418 not to apply a pre-pinch pose to grasp the item, the process 1400 may then proceed to select an air pressure to apply to the fingers based on the item, as at 1422. For example, based on the determined grasp mode, finger configuration, various item characteristics, and/or determined forces to apply to the item, as described at least with respect to FIG. 13, two or more grasping fingers of the finger assemblies may be actuated to grasp the item. Actuators associated with the two or more grasping fingers may move the grasping fingers responsive to various air pressures supplied to the actuators. In some examples, the actuators may comprise double acting pneumatic actuators, and different air pressures may be supplied to opposing sides or ends of the pneumatic actuators to cause movement of grasping fingers of the finger assemblies, which may comprise parallel linkage mechanisms as described herein. In addition, the supplied air pressures, or pressure differentials, may be correlated with forces to be applied to an item by the grasping fingers of the finger assemblies. Thus, desired air pressures, or desired air pressure differentials, may be selected to cause movement of two or more grasping fingers of the finger assemblies to grasp the item with desired forces. Further, a control system may select the air pressures, or air pressure differentials, to grasp the item using the grasping fingers.

After selecting the air pressures, or air pressure differentials, to grasp the item using the grasping fingers at 1422, or alternatively, if it is determined at 1412 not to use the fingers to grasp the item, the process 1400 may then continue with grasping the item using the selected air pressures, as at 1424. For example, based on the determined grasp mode, finger configuration, various item characteristics, and/or determined forces to apply to the item, as described at least with respect to FIG. 13, various selected or determined air pressures, or air pressure differentials, may be supplied to one or more actuators.

In some examples in which the grasp mode includes using a suction cup, the selected or determined air pressures, or air pressure differentials, may be supplied to actuators to extend and/or retract the suction cup, and/or to seal with and grasp the item using the suction cup, e.g., using suction or vacuum pressure. In other examples, in which the grasp mode includes using two or more grasping fingers, the selected or determined air pressures, or air pressure differentials, may be supplied to actuators to achieve a pre-pinch pose between two or more fingers, and/or to apply forces to an item to grasp the item. In further examples, various combinations, sequences, or orders of the suction cup and two or more grasping fingers may be actuated using selected or determined air pressures, or air pressure differentials, to grasp, transport, and release an item using the gripper system described herein. Further, a control system may instruct grasping of the item using the selected air pressures, or air pressure differentials.

The process 1400 may then end, as at 1426.

Figure 15:
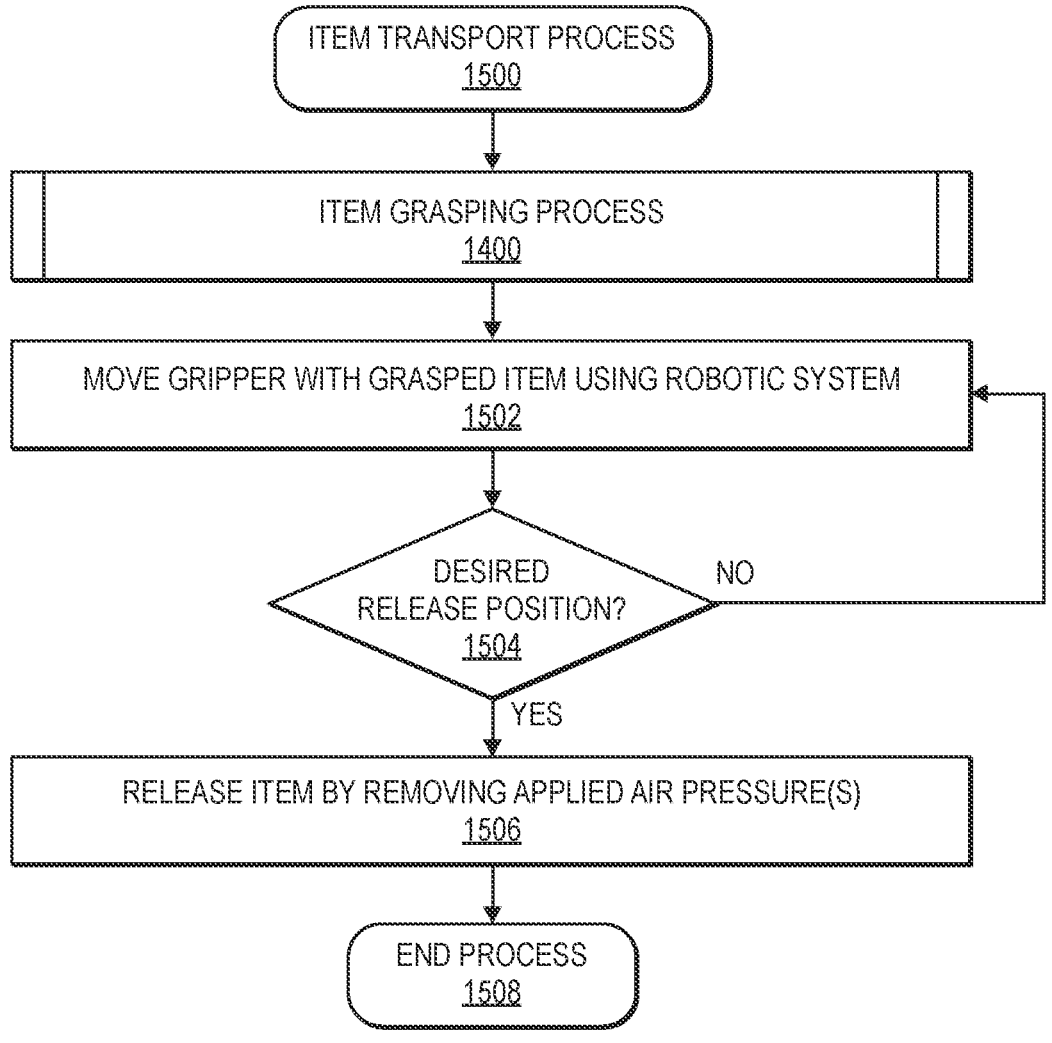
FIG. 15 is a flow diagram illustrating an example item transport process, in accordance with implementations of the present disclosure.

FIG. 15 is a flow diagram illustrating an example item transport process 1500, in accordance with implementations of the present disclosure.

The process 1500 may begin with the item grasping process 1400, as described herein with respect to FIG. 14. For example, the item may be grasped based on the determined grasp mode, finger configuration, various item characteristics, and/or determined forces to apply to the item, as described at least with respect to FIGS. 13 and 14. Further, a control system may instruct grasping of the item.

The process 1500 may continue to move the gripper with the grasped item using the robotic system, as at 1502. For example, the robotic system may be coupled to the gripper system, and may move the gripper system that has grasped the item from a pick or grasp location to a release or destination position. The robotic system may execute various translations, rotations, or other movements, e.g., along a transport path or trajectory, to position or orient the gripper system and grasped item at the release or destination position. Further, a control system may instruct movement of the gripper system via the robotic system.

The process 1500 may proceed to determine whether the grasped item is at the desired release position, as at 1504. For example, various sensors, such as cameras, scanning devices, proximity sensors, motion sensors, encoders, or other types of sensors may be associated with the robotic system and/or a facility within which the robotic system operates. Based on data from the various sensors, it may be determined whether the robotic system has moved the gripper system and grasped item to the desired release position. Further, a control system may determine whether the grasped item is at the desired release position.

If the grasped item is not at the desired release position, the process 1500 may return to step 1502 to continue to move the gripper system with the grasped item to the desired release position. If, however, the grasped item is at the desired release position, the process 1500 may continue with releasing the item by removing the applied air pressures, as at 1506. For example, upon positioning the grasped item at the desired release position, various air pressures, or air pressure differentials, supplied to portions of the gripper system may be removed, reversed, or otherwise modified to cause release of the item from the gripper system.

In some examples in which the grasp mode includes using a suction cup, the selected or determined air pressures, or air pressure differentials, may be removed from the suction cup to unseal from and cause release of the item from the suction cup. In addition, the supplied air pressures, or air pressure differentials, may be removed, substantially reversed, or otherwise modified to cause actuators to extend and/or retract the suction cup. In other examples, in which the grasp mode includes using two or more grasping fingers, the selected or determined air pressures, or air pressure differentials, may be removed, substantially reversed, or otherwise modified to cause actuators to remove forces that were applied to an item to grasp the item. In further examples, various combinations, sequences, or orders of removal, reversal, or other modification of selected or determined air pressures, or air pressure differentials, applied to the suction cup and two or more grasping fingers may be instructed to cause release of an item by the gripper system described herein. Further, a control system may instruct release of the item by removing, reversing, or modifying the selected air pressures, or air pressure differentials.

The process 1500 may then end, as at 1508.

Figure 16:
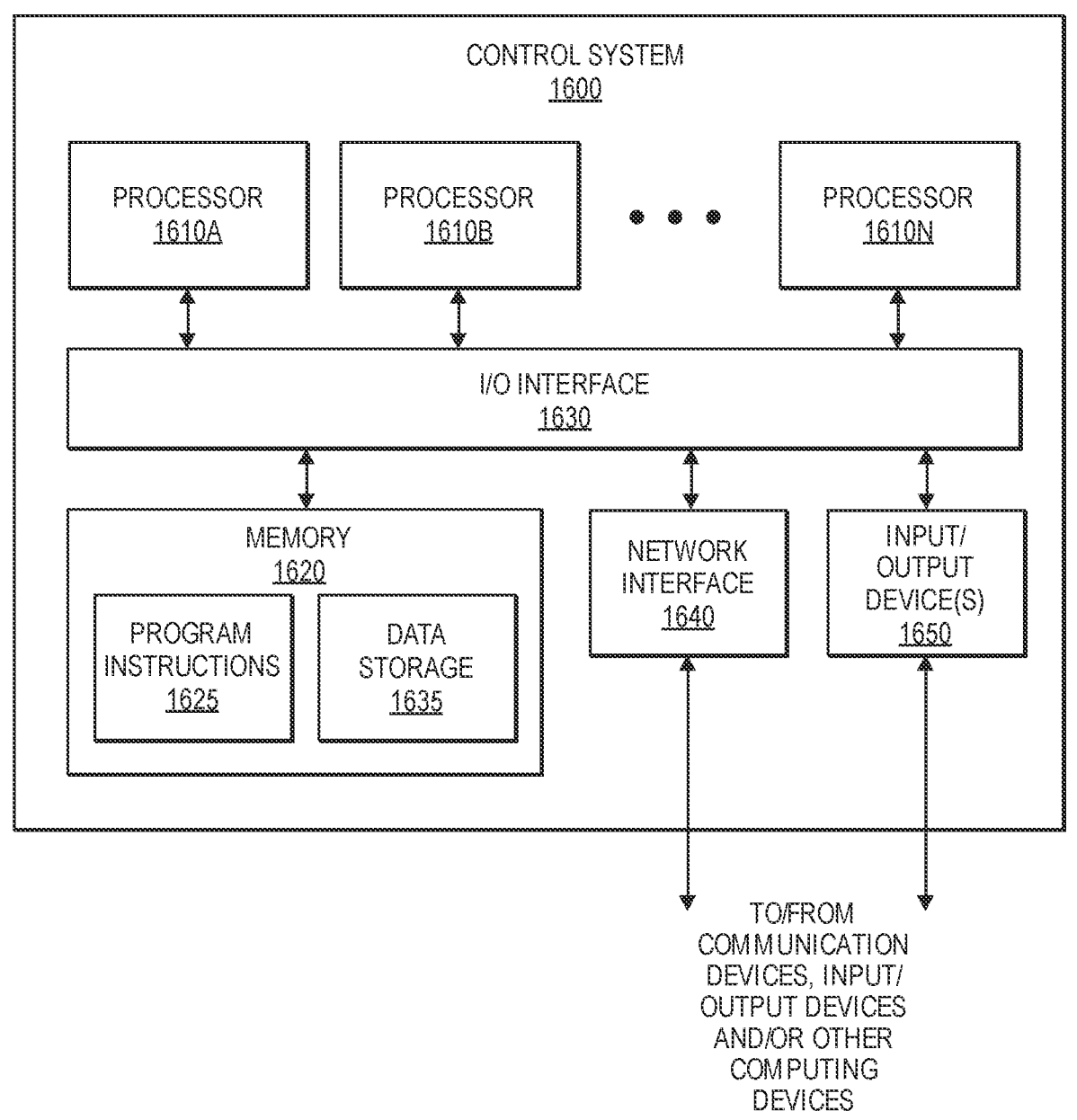
FIG. 16 is a block diagram illustrating various components of an example control system, in accordance with implementations of the present disclosure.

FIG. 16 is a block diagram illustrating various components of an example control system 1600, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 16. In the illustrated implementation, a control system 1600 includes one or more processors 1610A, 1610B through 1610N, coupled to a non-transitory computer-readable storage medium 1620 via an input/output (I/O) interface 1630. The control system 1600 further includes a network interface 1640 coupled to the I/O interface 1630, and one or more input/output devices 1650. In some implementations, it is contemplated that a described implementation may be implemented using a single instance of the control system 1600 while, in other implementations, multiple such systems or multiple nodes making up the control system 1600 may be configured to host different portions or instances of the described implementations. For example, in one implementation, some data sources or services (e.g., related to portions of multi-modal, reconfigurable, adaptive gripping systems, operations, or processes, etc.) may be implemented via one or more nodes of the control system 1600 that are distinct from those nodes implementing other data sources or services (e.g., related to other portions of multi-modal, reconfigurable, adaptive gripping systems, operations, or processes, etc.).

In various implementations, the control system 1600 may be a uniprocessor system including one processor 1610A, or a multiprocessor system including several processors 1610A-1610N (e.g., two, four, eight, or another suitable number). The processors 1610A-1610N may be any suitable processor capable of executing instructions. For example, in various implementations, the processors 1610A-1610N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1610A-1610N may commonly, but not necessarily, implement the same ISA.

The non-transitory computer-readable storage medium 1620 may be configured to store executable instructions and/or data accessible by the one or more processors 1610A-1610N. In various implementations, the non-transitory computer-readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1620 as program instructions 1625 and data storage 1635, respectively. In other implementations, program instructions and/or data may be received, sent or stored upon different types of computer-accessible media, such as non-transitory media, or on similar media separate from the non-transitory computer-readable storage medium 1620 or the control system 1600. Generally speaking, a non-transitory, computer-readable storage medium may include storage media or memory media such as magnetic or optical media, e.g., disk or CD/DVD-ROM, coupled to the control system 1600 via the I/O interface 1630. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1640.

In one implementation, the I/O interface 1630 may be configured to coordinate I/O traffic between the processors 1610A-1610N, the non-transitory computer-readable storage medium 1620, and any peripheral devices, including the network interface 1640 or other peripheral interfaces, such as input/output devices 1650. In some implementations, the I/O interface 1630 may perform any necessary protocol, timing or other data transformations to convert data signals from one component (e.g., non-transitory computer-readable storage medium 1620) into a format suitable for use by another component (e.g., processors 1610A-1610N). In some implementations, the I/O interface 1630 may include support for devices attached through various types of peripheral buses, such as a variant of the Peripheral Component Interconnect (PCI) bus standard or the Universal Serial Bus (USB) standard, for example. In some implementations, the function of the I/O interface 1630 may be split into two or more separate components, such as a north bridge and a south bridge, for example. Also, in some implementations, some or all of the functionality of the I/O interface 1630, such as an interface to the non-transitory computer-readable storage medium 1620, may be incorporated directly into the processors 1610A-1610N.

The network interface 1640 may be configured to allow data to be exchanged between the control system 1600 and other devices attached to a network, such as other control systems, material handling system controllers, warehouse management systems, other computer systems, gantry systems, robotic arms, or movement systems, various types of sensors, various types of vision systems, imaging devices or imaging sensors, upstream stations or processes, downstream stations or processes, other material handling systems or equipment, or between nodes of the control system 1600. In various implementations, the network interface 1640 may support communication via wired or wireless general data networks, such as any suitable type of Ethernet network.

Input/output devices 1650 may, in some implementations, include one or more displays, monitors, projection devices, other visual input/output devices, microphones, speakers, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1600. Multiple input/output devices 1650 may be present in the control system 1600 or may be distributed on various nodes of the control system 1600. In some implementations, similar input/output devices may be separate from the control system 1600 and may interact with one or more nodes of the control system 1600 through a wired or wireless connection, such as over the network interface 1640.

As shown in FIG. 16, the memory 1620 may include program instructions 1625 that may be configured to implement one or more of the described implementations and/or provide data storage 1635, which may comprise various tables, data stores and/or other data structures accessible by the program instructions 1625. The program instructions 1625 may include various executable instructions, programs, or applications to facilitate multi-modal, reconfigurable, adaptive gripping operations and processes described herein, such as gantry system, robotic arm, or movement system controllers, drivers, or applications, perception system controllers, drivers, or applications, suction cup assembly controllers, drivers, or applications, reconfigurable finger assembly controllers, drivers, or applications, grasping finger controllers, drivers, or applications, pressure-regulated actuation assembly controllers, drivers, or applications, sensor controllers, drivers, or applications, sensor data processing applications, material handling equipment controllers, drivers, or applications, etc. The data storage 1635 may include various data stores for maintaining data related to systems, operations, or processes described herein, such as movement systems, gantry systems, robotic arms, perception systems, sensors, sensor data, gripper or gripping systems, suction cup assemblies, static finger assemblies, reconfigurable finger assemblies, motors, actuators, geartrains, parallel linkage mechanisms, pneumatic actuators, air pressure or vacuum sources, control valves, pneumatic lines, items, item characteristics, grasping parameters, grasp modes, finger configurations, applied forces, supplied air pressures or differentials, material handling equipment or apparatus, etc.

Those skilled in the art will appreciate that the control system 1600 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 13-15, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A gripping system, comprising:
   a central assembly;
   a static finger assembly coupled to the central assembly, wherein the static finger assembly includes a first finger assembly that is movable via a first double acting pneumatic actuator between a raised position and a lowered position;
   two reconfigurable finger assemblies rotatably coupled to the central assembly, wherein the two reconfigurable finger assemblies include a second finger assembly that is movable via a second double acting pneumatic actuator between a raised position and a lowered position and a third finger assembly that is movable via a third double acting pneumatic actuator between a raised position and a lowered position;
   a suction cup assembly coupled to the central assembly, wherein the suction cup assembly includes a suction cup that is movable via a fourth double acting pneumatic actuator between a retracted position and an extended position;
   a pressure-regulated actuation assembly configured to actuate the first, second, third, and fourth double acting pneumatic actuators, wherein the pressure-regulated actuation assembly includes a source, a control valve, and a plurality of pneumatic lines; and
   a control system configured to at least:
      receive data associated with an item to grasp;
      select a mode from a plurality of modes to grasp the item based on the data, wherein the plurality of modes include at least one of suction using the suction cup, or gripping using at least two of the first finger assembly, the second finger assembly, or the third finger assembly;

select a finger configuration from a plurality of finger configurations to grasp the item based on the data, wherein the plurality of finger configurations include an offset opposed configuration, an in-line opposed configuration, and a radial configuration;

select a force to apply to grasp the item based on the data; and grasp the item using the selected mode, the selected finger configuration, and the selected force.

2. The gripping system of claim 1, wherein the static finger assembly is rotationally fixedly coupled to the central assembly.

3. The gripping system of claim 1, wherein the central assembly includes an actuator and a geartrain operatively coupled to the two reconfigurable finger assemblies and configured to rotate the two reconfigurable finger assemblies relative to the central assembly.

4. The gripping system of claim 1, wherein the suction cup assembly is further coupled to a vacuum source to provide vacuum pressure to the suction cup.

5. The gripping system of claim 1, wherein the control valve comprises a solenoid having five ports and two positions, the five ports including a source port, a first output port, a second output port, a first exhaust port, and a second exhaust port;

wherein a first set of the plurality of pneumatic lines is connected between the first output port and first ends of the first, second, third, and fourth double acting pneumatic actuators; and wherein a second set of the plurality of pneumatic lines is connected between the second output port and second ends of the first, second, third, and fourth double acting pneumatic actuators.

6. A system, comprising:

a central assembly;

a static finger assembly coupled to the central assembly, wherein the static finger assembly includes a first finger assembly that is movable via a first pneumatic actuator between a raised position and a lowered position;

two reconfigurable finger assemblies rotatably coupled to the central assembly, wherein the two reconfigurable finger assemblies include a second finger assembly that is movable via a second pneumatic actuator between a raised position and a lowered position and a third finger assembly that is movable via a third pneumatic actuator between a raised position and a lowered position; and a pressure-regulated actuation assembly configured to actuate at least two of the first, second, or third pneumatic actuators, wherein the pressure-regulated actuation assembly includes a source, a control valve, and a plurality of pneumatic lines.

7. The system of claim 6, wherein the static finger assembly is rotationally fixedly coupled to the central assembly.

8. The system of claim 6, wherein the central assembly includes an actuator and a geartrain operatively coupled to the two reconfigurable finger assemblies and configured to rotate the two reconfigurable finger assemblies relative to the central assembly; and wherein the two reconfigurable finger assemblies are configured to rotate in opposite rotational directions from each other.

9. The system of claim 8, wherein in first positions of the two reconfigurable finger assemblies, the static finger assembly and the two reconfigurable finger assemblies form an offset opposed finger configuration;

wherein in second positions of the two reconfigurable finger assemblies, the static finger assembly and the two reconfigurable finger assemblies form a radial finger configuration; and wherein in third positions of the two reconfigurable finger assemblies, the two reconfigurable finger assemblies form an in-line opposed finger configuration.

10. The system of claim 6, wherein the first, second, and third pneumatic actuators comprise double acting pneumatic actuators.

11. The system of claim 10, wherein the control valve comprises a solenoid having five ports and two positions, the five ports including a source port, a first output port, a second output port, a first exhaust port, and a second exhaust port;

wherein the source port is connected to the source;

wherein a first set of the plurality of pneumatic lines is connected between the first output port and first ends of at least two of the first, second, or third double acting pneumatic actuators; and wherein a second set of the plurality of pneumatic lines is connected between the second output port and second ends of at least two of the first, second, or third double acting pneumatic actuators.

12. The system of claim 11, wherein in a first position of the solenoid, the source port is connected to the first output port, and the second output port is connected to the second exhaust port; and wherein in a second position of the solenoid, the source port is connected to the second output port, and the first output port is connected to the first exhaust port.

13. The system of claim 12, wherein in the first position of the solenoid, air pressure supplied by the source is communicated to the first ends of at least two of the first, second, or third double acting pneumatic actuators via the source port and the first output port, and wherein air within the second ends of at least two of the first, second, or third double acting pneumatic actuators is vented via the second output port and the second exhaust port; and wherein in the second position of the solenoid, air pressure supplied by the source is communicated to the second ends of at least two of the first, second, or third double acting pneumatic actuators via the source port and the second output port, and wherein air within the first ends of at least two of the first, second, or third double acting pneumatic actuators is vented via the first output port and the first exhaust port.

14. The system of claim 6, wherein the first, second, and third finger assemblies comprise parallel linkage mechanisms coupled between respective pneumatic actuators and respective grasping fingers; and wherein each of the parallel linkage mechanisms includes three linkages having first ends movably coupled to respective pneumatic actuators in a first triangular arrangement and having second ends movably coupled to respective grasping fingers in a second triangular arrangement.

15. The system of claim 14, wherein for each of the parallel linkage mechanisms of the first, second, and third finger assemblies, a single linkage of the three linkages is actuated by a respective pneumatic actuator to move a respective finger assembly between a raised position and a lowered position.

16. The system of claim 6, further comprising:

a suction cup assembly coupled to the central assembly, wherein the suction cup assembly includes a suction cup that is movable via a fourth pneumatic actuator between a retracted position and an extended position;

wherein the suction cup assembly is further coupled to a vacuum source to provide vacuum pressure to the suction cup.

17. A method, comprising:

receiving, by a control system, data associated with an item to grasp via a gripping system, the gripping system comprising a central assembly, a static finger assembly coupled to the central assembly and including a first finger assembly movable via a first pneumatic actuator, two reconfigurable finger assemblies rotatably coupled to the central assembly and including a second finger assembly movable via a second pneumatic actuator and a third finger assembly movable via a third pneumatic actuator, and a pressure-regulated actuation assembly configured to actuate at least two of the first, second, or third pneumatic actuators via a source, a control valve, and a plurality of pneumatic lines;

selecting, by the control system, a force to apply to grasp the item based on the data;

selecting, by the control system, an air pressure to apply to the at least two of the first, second, or third pneumatic actuators to generate the selected force; and causing, by the control system, grasping of the item by at least two of the first, second, or third finger assemblies using the selected air pressure.

18. The method of claim 17, further comprising:

selecting, by the control system, a finger configuration from a plurality of finger configurations to grasp the item based on the data, wherein the plurality of finger configurations include an offset opposed configuration, an in-line opposed configuration, and a radial configuration; and causing, by the control system, reconfiguration of at least one of the two reconfigurable finger assemblies based on the selected finger configuration;

wherein the item is further grasped using the selected finger configuration.

19. The method of claim 17, further comprising:

selecting, by the control system, a pre-pinch pose to grasp the item based on the data;

selecting, by the control system, a pre-pinch air pressure to apply to the at least two of the first, second, or third pneumatic actuators to achieve the pre-pinch pose; and causing, by the control system, movement of the at least two of the first, second, or third finger assemblies to the pre-pinch pose using the selected pre-pinch air pressure.

20. The method of claim 17, wherein the gripper system further comprises a suction cup assembly coupled to the central assembly and including a suction cup movable via a fourth pneumatic actuator; and the method further comprising:

selecting, by the control system, a mode from a plurality of modes to grasp the item based on the data, wherein the plurality of modes include at least one of suction using the suction cup, or gripping using at least two of the first, second, or third finger assemblies;

wherein the item is further grasped using the selected mode.

* * * * *